United States Patent [19]

Bien et al.

[11] 4,115,378

[45] Sep. 19, 1978

[54] WATER SOLUBLE REACTIVE AZODYESTUFFS CONTAINING A FLUOROTRIAZINYL GROUP ATTACHED VIA A NITROGEN BRIDGE TO THE DYESTUFF MOLECULE

[75] Inventors: Hans-Samuel Bien, Burscheid; Erich Klauke, Odenthal-Hahnenberg; Klaus Wunderlich, Leverkusen, all of Germany

[73] Assignee: Bayer Aktiengesellschaft, Leverkusen, Germany

[21] Appl. No.: 151,149

[22] Filed: Jun. 8, 1971

Related U.S. Application Data

[63] Continuation of Ser. No. 721,180, Apr. 15, 1968, abandoned.

[30] Foreign Application Priority Data

Apr. 19, 1967 [DE] Fed. Rep. of Germany .......... 52,178

[51] Int. Cl.² .................. C09B 62/04; C09B 62/06; C09B 62/08; C09B 62/10
[52] U.S. Cl. .............................. 260/146 T; 260/147; 260/153; 544/181; 544/187; 544/194
[58] Field of Search ............... 260/146 T, 153, 147, 260/145 B

[56] References Cited

U.S. PATENT DOCUMENTS

| | | | |
|---|---|---|---|
| 2,889,316 | 6/1959 | Heckendorn et al. | 260/153 |
| 2,891,941 | 6/1959 | Fasciati et al. | 260/153 |
| 2,929,809 | 3/1960 | Menzi et al. | 260/146 T |
| 2,943,084 | 6/1960 | Buehler et al. | 260/145 B |
| 2,945,021 | 7/1960 | Fasciati et al. | 260/153 |
| 2,979,498 | 4/1961 | Andrew et al. | 260/153 |
| 3,135,731 | 6/1964 | Tilley et al. | 260/153 |
| 3,190,872 | 6/1965 | Oesterlein et al. | 260/153 |
| 3,256,268 | 6/1966 | Dussy | 260/146 T |
| 3,268,505 | 8/1966 | Schündehütte et al. | 260/146 T |
| 3,399,194 | 8/1968 | Mangini et al. | 260/153 X |
| 3,433,781 | 3/1969 | Ackermann et al. | 260/146 D |
| 3,446,790 | 5/1969 | Andrew | 260/153 |
| 3,455,897 | 7/1969 | Barben | 260/146 D |
| 3,484,430 | 12/1969 | Andrew et al. | 260/145 B |
| 3,484,431 | 12/1969 | Schneider | 260/146 T |
| 3,502,644 | 3/1970 | Nickel et al. | 260/154 |
| 3,544,546 | 12/1970 | Crabtree et al. | 260/145 B |
| 3,669,951 | 6/1972 | Bien et al. | 260/154 |

*Primary Examiner*—Floyd D. Higel
*Attorney, Agent, or Firm*—Plumley and Tyner

[57] ABSTRACT

Reactive dyestuffs are disclosed having the formula

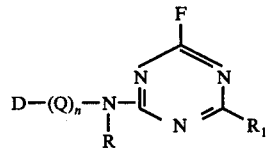

in which

D is the radical of an organic nonanthraquinoid dyestuff; R is hydrogen or a lower alkyl; $R_1$ is amino or substrated amino with substituents attached by a single bond, optionally etherified hydroxy, optionally etherified mercapto or an optionally substituted hydrocarbon radical; Q is an alkylene, aralkylene, arylene, —CO— or —SO— which is directly linked to a carbon atom of the ring of the dyestuff D; n is the number 0 or 1 and F is a fluoro substituent. The group —N(R) is directly linked to a carbon atom of the triazine ring and on the other side, the group —N(R) is linked to a carbon atom of the ring of the dyestuff D either directly (if n = 0) or (if n = 1) via one of the bridge members mentioned above. These dyestuffs are primarily suitable for dyeing of textile materials containing hydroxyl or nitrogen such as natural and regenerated cellulose, wood silk, polyamide and polyurethane. The fastness properties, particularly wet fastness, are excellent.

24 Claims, No Drawings

WATER SOLUBLE REACTIVE AZODYESTUFFS CONTAINING A FLUOROTRIAZINYL GROUP ATTACHED VIA A NITROGEN BRIDGE TO THE DYESTUFF MOLECULE

This application is a continuation of U.S. Patent application Ser. Number 721,180, filed Apr. 15, 1968, now abandoned.

The present invention relates to valuable new reactive dyestuffs of the general structure

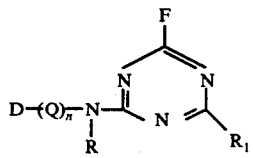

in this formula D denotes the radical of an organic non-anthraquinoid dyestuff, R is hydrogen or a lower alkyl group, $R_1$ is an amino group which may contain substituents attached by a single bond, an optionally etherified hydroxy group, an optionally etherified thio group or an optionally substituted hydrocarbon radical, Q is an alkylene, aralkylene, arylene, —CO— or —SO- group which is directly linked to a carbon atom of the ring of the dyestuff D, n is the number 0 or 1 and F is a fluoro substituent.

In the dyestuffs of the general formula (I), the group —N(R) is directly linked to a carbon atom of the triazine ring. On the other side, the group —N(R) is linked to a carbon atom of the ring of the dyestuff D either directly (if n = 0) or (if n = 1) via one of the bridge members mentioned above.

Examples of substituents $R_1$ in the triazine ring are: primary, secondary or tertiary amino groups, such as —NH$_2$, —NHCH$_3$, —NHC$_2$H$_5$, —N(CH$_3$)$_2$, —N(C$_2$H$_5$)$_2$, —NHCH$_2$CH$_2$OH, —N(CH$_2$CH$_2$OH)$_2$, morpholino, piperidino, hydrazino, N-methylhydrazino, N-phenylamino, N-(2-, 3- or 4-sulphophenyl)-amino, N-toluidino, N-(2,3- or 2,4- or 2,5- or 4,5-disulphophenyl)-amino-, —OH, —OCH$_3$, —OC$_2$H$_5$, phenyloxy-, sulphophenyloxy-, —SH, —SCH$_3$, —SC$_2$H$_5$, phenyl, hydroxyphenyl, sulphophenyl, methyl, trichloromethyl, 2-, 3- or 4-chlorophenyl and other radicals.

Dyestuffs in which $R_1$ stands for an optionally substituted alkoxy group or a mono- or disubstituted amino group where, by definition, the substituents are linked to the amino group by single bonds, and R stands for hydrogen, belong to a preferred group of the compounds according to the invention.

The new dyestuffs may contain the radical

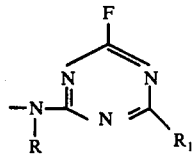

once or several times in the molecule. Dyestuffs with 1 to 2 reactive radicals of this kind are preferred for reasons of economy.

Suitable triazine rings

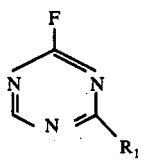

are, for example: 2-fluoro-4-amino-6-triazinyl, 2-fluoro-4-methylamino-6-triazinyl, 2-fluoro-4-phenylamino-6-triazinyl, 2-fluoro-4-(o-, m- or p-sulphophenyl)-amino-6-triazinyl, 2-fluoro-4-(2,4- or 2,5- or 3,5- or 4,5-disulphophenyl)-amino-6-triazinyl, 2-fluoro-4-dimethylamino-6-triazinyl, 2-fluoro-4-methoxy-6-triazinyl, 2-fluoro-4-(β-methoxy-ethoxy)-6-triazinyl, 2-fluoro-4-hydrazino-6-triazinyl, 2-fluoro-4-phenoxy-6-triazinyl, 2-fluoro-4-(2-, 3- or 4-sulphophenoxy)-6-triazinyl, 2-fluoro-4-benzyloxy-6-triazinyl, 2-fluoro-4-(β-hydroxyethoxy)-6-triazinyl, 2-fluoro-4-(β-hydroxyethylmercapto)-6-triazinyl, 2-fluoro-4-methyl-6-triazinyl, 2-fluoro-4-phenyl-6-triazinyl, 2-fluoro-4-(2'-, 3'- or 4'-sulphophenyl)-6-triazinyl, 2-fluoro-4-diethylamino-6-triazinyl, 2-fluoro-4-(β-bis-hydroxyethylamino)-6-triazinyl, 2-fluoro-4-methylmercapto-6-triazinyl, 2-fluoro-4-phenylmercapto-6-triazinyl, 2-fluoro-4-(2'-, 3'- or 4'-chloro-phenylmercapto)-6-triazinyl or 2-fluoro-4-(2'-, 3'- or 4'-sulphophenylmercapto)-6-triazinyl, 2-fluoro-4-(N-methyl-N-phenyl)-amino-6-triazinyl, 2-fluoro-4-(o-, m- or p-methyl-phenyl)-amino-6-triazinyl, 2-fluoro-4-(o,o'-dimethyl-phenyl)-amino-6-triazinyl, 2-fluoro-4-n-butyl-amino-6-triazinyl, 2-fluoro-4-benzylamino-6-triazinyl, 2-fluoro-4-(N-methyl-N-β-cyano-ethyl)-amino-6-triazinyl, 2-fluoro-4-N,N-bis-cyano-ethyl-amino-6-triazinyl.

Among the possibilities of attaching the radical (II) to D, the direct linkage of the groups -N(R) to a carbon atom of a carbocyclic ring of D is preferred. Suitable bridge members of this or another kind, including the group —N(R), are for example, (A stands for the radical of the formula (III)): —NH—A, —N(CH$_3$)—A, —N(C$_2$H$_5$)—A, —N(C$_3$H$_7$)—A, —CONH—A, —SO$_2$NH—A, —CON(CH$_3$)—A, —SO$_2$N(CH$_3$)—A and the corresponding N-ethyl- and N-propylamides, —CH$_2$—NH—A, —CH$_2$—N(CH$_3$)—A, —CH$_2$—N(C$_2$H$_5$)—A, —CH$_2$—CONH—A,

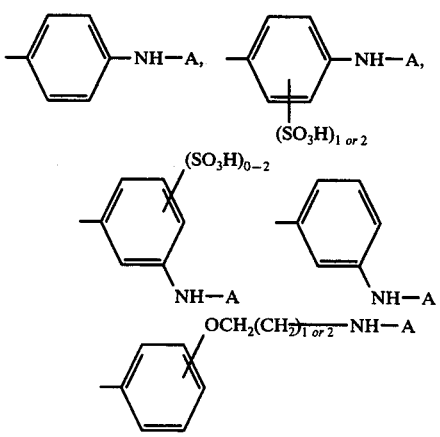

-continued

CH₂(CH₂)₀ or ₁—NH—A.

The new dyestuffs are of a non-anthraquinoid type and may belong, for example, to the series of metal-free or metal-containing mono- or polyazo dyestuffs; metal-free or metal-containing azaporphin dyestuffs, such as copper- or nickel-phthalocyanine dyestuffs; to the oxazine, dioxazine, triphenylmethane, nitro and azomethine series. Among these, the mono- and disazo dyestuffs as well as the copper- and nickel-phthalocyanine dyestuffs are of particular interest. Within the scope of these classes of dyestuffs, dyestuffs of the following general structures are particularly valuable, inter alia:

1. Azo dyestuffs

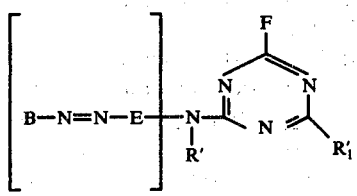

in which B and E represent aromatic, carbocyclic or heterocyclic radicals and, in particular, B is the radical of a carbocyclic diazo component of the benzene or naphthalene series, and E is the radical of an enolic or phenolic coupling component, e.g. a 5-pyrazolone, and acetoacetic acid arylamide, a hydroxy-naphthalene or an aminonaphthalene; B and E may otherwise contain any substitutents customary in azo dyestuffs, including further azo groups; R' stands for a group —CH₃ or, preferably, for a hydrogen atom, F is a fluoro substituent and R'₁ stands for a preferably mono- or disubstituted amino group in which the substituents are linked to the amino group by single bonds, or R'₁ stands for an optionally substituted alkoxy group.

Especially valuable dyestuffs of this series are those which are water-soluble and, in particular, those which contain sulphonic acid and/or carboxylic acid groups. The azo dyestuffs may be metal-free or metal-containing, the copper, chromium and cobalt complexes being the preferred metal complexes.

Important azo dyestuffs are, for example, those of the benzene-azo-naphthalene series, the benzene-azo-1-phenyl-5-pyrazolone series, the benzene-azo-aminonaphthalene series, the naphthalene-azo-naphthalene-series, the naphthalene-azo-1-phenylpyrazolone-5 series and the stilbene-azo-benzene series, the dyestuffs which contain sulphonic acid groups being again preferred. In the case of metal complex azo dyestuffs, the groups attached to the metal complex are preferably in the o-positions to the azo group, for example, in the form of o,o'-dihydroxy-, o-hydroxy-o'-carboxy-, o-carboxy-o'-amino- and o-hydroxy-o'-aminoazo groupings. Particularly eminent types of monoazo dyestuffs of the kind obtainable according to the invention are illustrated by the following formulae:

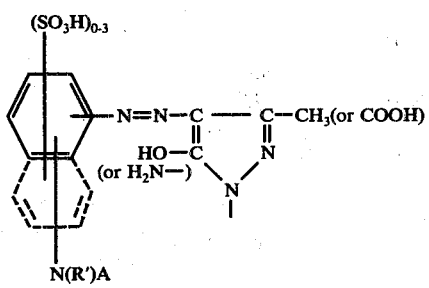

(V)

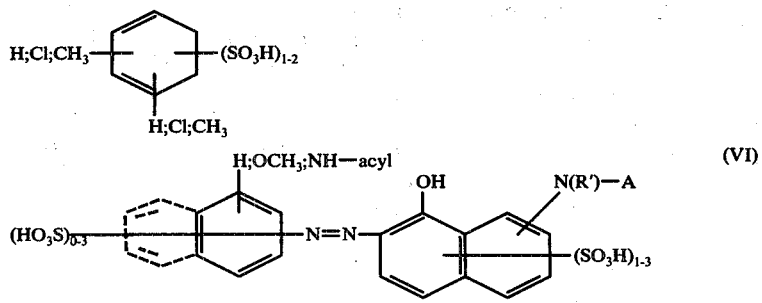

(VI)

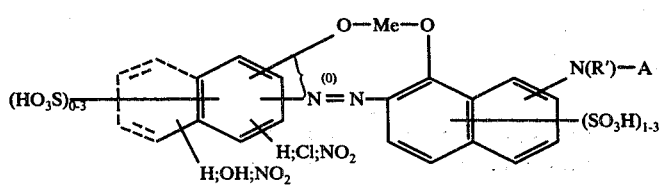

(VII)

Me = Cu;Cr;Co

-continued

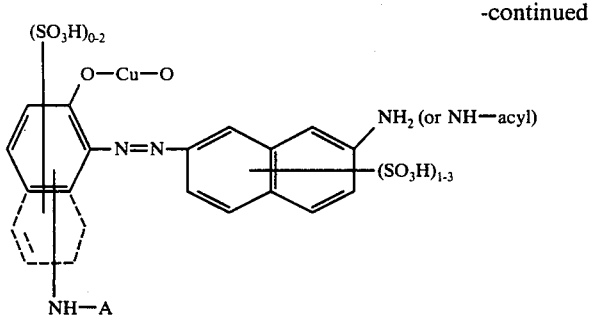

(VIII)

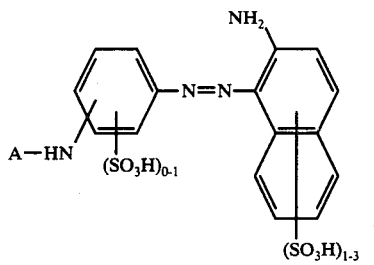

(IX)

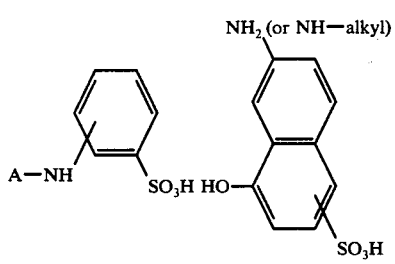

(IXa)

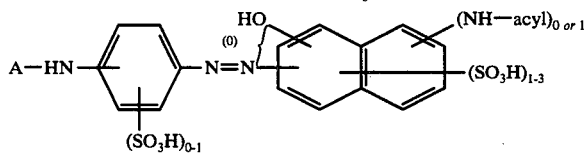

(X)

{(o) denotes that the radicals concerned stand in the o-position in the aryl nucleus, and A stands for the radical of the formula

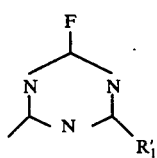

in which R'₁ and F have the same meaning as above; acyl stands for an acyl radical; the nuclei drawn with dotted lines indicate that these nuclei may be present or absent.

2. Phthalocyanine dyestuffs

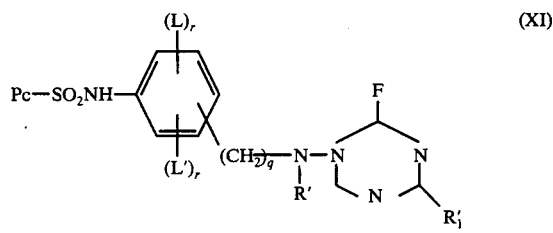

(XI)

in this formula Pc stands for the radical of a nickel- or copper-phthalocyanine, L and L' are substituents, especially sulphonic acid groups, $r$ is an integer from 0 to 2, $q$ is the number 0 or 1, R' is a methyl group or, preferably, hydrogen, R'₁ stands for a preferably mono- or disubstituted amino group in which the substituents are linked to the amino group by single bonds, or for an optionally substituted alkoxy group, and F is fluoro substituent. The phthalocyanine radical Pc preferably carries, as further substituents, 1-2 sulphonic acid and/or 1-2 sulphonic acid amide groups, such as —SO₂NH₂, —SO₂NH—alkyl, —SO₂N(alkyl)₂ and —SO₂NH(aryl) groups, "alkyl" standing for alkyl radicals with 1-3 carbon atoms.

The above compilation of a selection of suitable azo and azaporphin dyestuffs and fluoro-substituted triazine rings does not imply in any way a limitation of the general formulae, either in respect of the possible methods of preparing such dyestuffs within the scope of the general formula (I), or in respect of the valuable properties of these products with regard to application techniques. The new dyestuffs may otherwise contain any substituents customary in dyestuffs, such as sulphonic acid, carboxylic acid; sulphonamide and carbonamide groups which may be further substituted on the nitrogen atom of the amide; sulphonic acid ester and carboxylic acid ester groups; alkyl, aralkyl and aryl radicals; alkylamino, aralkylamino, arylamino, acylamino, nitro, cyano groups; halogen, such as Cl, Br and F; hydroxy, alkoxy, thioether, azo groupings and the like. The dyestuffs may also contain further groupings capable of fixation, such as mono- or dihalo-triazinylamino, mono-, di- or trihalopyrimidinylamino, 2,3-dihalo-quinoxaline-6-carbonyl- or -6-sulphonylamino, 1,4-dihalo-phthalazine-6-carbonyl- or -6-sulphonylamino, 2-halo- or 2-alkylsulphonyl- or 2-arylsulphonylbenzothiazole-5-carbonyl- or -5-sulphonylamino, alkylsulphonylpyrimidinyl, arylsulphonyl-pyrimidinyl-, esterified sulphonic acid hydroxy alkylamide- and hydroxyalkylsulphone groups, sulphofluoride, halo-alkylamino, acryloylamino, haloacylamino groups or other reactive groups.

The new dyestuffs of the formula (I) are obtained by introducing into organic, non-anthraquinoid dyestuffs or dyestuff intermediates, by known methods, at least one group of the formula

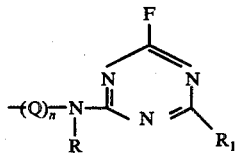

(IIIa)

If dyestuff intermediates are used, these are then converted into the desired final dyestuffs in known manner, in particular, by diazotisation and/or coupling and/or condensation reactions; in the formula (IIIa) $R_1$ denotes an amino group which may contain substituents attached by a single bond, an optionally etherified hydroxy group, an optionally etherified thio group or an optionally substituted hydrocarbon radical, F is a fluoro substituent, R is hydrogen or a lower alkyl group. Q is an alkylene, aralkylene, arylene, —CO— or —SO$_2$— group which is linked directly to a carbon atom of the ring of the dyestuff D, and n is the number 0 or 1.

The introduction of the radical (III) via an amino or amide group —(Q)$_n$N(R)—, wherein Q, R and n have the same meaning as above, into dyestuffs or dyestuff intermediates is generally carried out by reacting non-anthraquinoid dyestuffs or dyestuff intermediates which contain at least one group

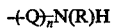

in which Q, R and n have the same meaning as above, attached to a ring carbon atom, with compounds of the general formula

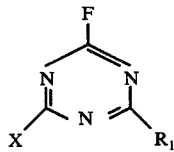

(XII)

in which $R_1$ and F have the same meaning as above and X stands for a radical which can be split off as anion, and, in the case where dyestuff intermediates are used, converting these in a suitable manner into the desired final dyestuffs. Among the reactive substituents which can be split off as anions, the fluoro substituent is of particular interest. Other radicals which can be split off as anions and are suitable according to circumstances are, for example, quaternary ammonium groups, such as —N$^+$(CH$_3$)$_3$ and —N$^+$(C$_2$H$_5$)$_3$.

According to another method of preparation, the new dyestuffs are obtained by condensing non-anthraquinoid dyestuffs of the formula

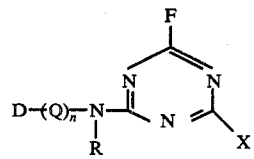

(XIII)

in which D, Q, R, F, X and n have the same meaning as above, with ammonia or with amino, hydroxy or thio compounds containing a reactive hydrogen atom, HX being split off.

Triazine compounds suitable for the reactions mentioned above are, for example 2,4,6-sym.-trifluorotriazine, 2,4-difluoro-6-amino-sym.-triazine, 2,4-difluoro-6-methylamino-sym.-triazine, 2,4-difluoro-6-ethylamino-sym.-triazine, 2,4-difluoro-6-phenyl-amino-sym.-triazine, 2,4-difluoro-6-(2'- or 4'- or 6'-sulpho-phenyl)-amino-sym.-triazine, 2,4-difluoro-6-(2,4- or 3,4-or 2,5- or 4,5-disulphophenyl)-amino-sym.-triazine, 2,6-difluoro-4-dimethylamino-triazine, 2,6-difluoro-4-methoxy-triazine, 2,6-difluoro-4-(β-methoxy-ethoxy)-triazine, 2,6-difluoro-4-hydrazinotriazine, 2,6-difluoro-4-phenoxy-triazine, 2,6-difluoro-4-(2-, 3- or 4-sulphophenoxy)-triazine, 2,6-difluoro-4-benzyloxy-triazine, 2,6-difluoro-4-(β-hydroxyethoxy)-triazine, 2,6-difluoro-4-β-hydroxyethylmercapto-triazine, 2,6-difluoro-4-methyl-triazine, 2,6-difluoro-4-phenyl-triazine, 2,6-difluoro-4-(2-, 3- or 4-sulphophenyl)-triazine, 2,6-difluoro-4-diethylmercapto-triazine, 2,6-difluoro-4-(β-bis-hydroxyethylamino)-triazine, 2,6-difluoro-4-methylmercapto-triazine, 2,6-difluoro-4-phenylmercapto-triazine, 2,6-difluoro-4-(2-, 3- or 4-chloro-phenylmercapto)-triazine or 2,6-difluoro-4-(2-, 3- or 4-sulphophenylmercapto)-triazine, 2,4-difluoro-6-(N-methyl-N-phenyl)-amino-sym.triazine, 2,4-difluoro-6-(o-, m- or p-methylphenyl)-amino-sym.triazine, 2,4-difluoro-6-(o,o'-dimethyl-phenyl)-amino-sym.triazine, 2,4-difluoro-6-n-butylamino-sym.triazine, 2,4-difluoro-6-benzylamino-sym.triazine, 2,4-difluoro-6-(N-methyl-N-β-cyano-ethyl)-amino-sym.triazine, 2,4-difluoro-6-N,N-bis-cyano-ethyl-amino-sym.triazine.

In the condensation reaction with the non-anthraquinoid dyestuffs or dyestuff intermediates containing amino or amide groups, these triazine derivatives react with the elimination of the radical X.

The fluoro-triazine compounds mentioned above and others which can be used according to the invention are generally readily obtained by reacting the corresponding chloro or bromo compounds with alkali metal fluorides, for example, with potassium fluoride, NaHF, KSO$_2$F, SOF$_3$, AgF$_2$, or by reacting corresponding OH compounds with SF$_4$, COF$_2$, COClF or cyanuric fluoride, or by heating corresponding diazonium tetrafluoroborates.

The reaction of the dyestuffs or dyestuff intermediates containing amino or amide groups with heterocyclic compounds of the formula (XII) and the reaction of dyestuffs of the formula (XIII) with amino, hydroxy or thio compounds is carried out in accordance with the starting compounds used in an organic, aqueous-organic or aqueous medium at temperatures of −10° C. to 100°

C., preferably at 0° to 50° C., in the presence of alkaline condensation agents, such as aqueous alkali metal carbonate or alkali metal hydroxide solutions.

If dyestuff intermediates are used, the condensation products obtained are converted in usual manner into the desired final dyestuffs. This process is primarily interesting for the preparation of azo dyestuffs in that, for example, a diazo and/or coupling component containing a reactive amino or amido group of the type defined above, is first reacted with the reactive component (XII) and the resultant intermediate subsequently converted by diazotisation and/or coupling and/or condensation into an azo dyestuff. In the latter further conversion reactions as are customary in azo dyestuffs can subsequently be carried out, for example, acylation, condensation, reduction and metallisation reactions.

Also when preparing other dyestuffs, especially those of the phthalocyanine series, the condensation of a reactive component (XII) can first be performed with an intermediate, for example, with m-phenylene-diamine or an m-phenylene-diaminosulphonic acid, and the reaction product obtained can subsequently be further condensed with a copper- or nickel- phthalocyaninesulphonic acid halide to form a reactive phthalocyanine dyestuff.

Another variant for the preparation of the new dyestuffs of the formula (I) which is applicable in some cases consists in that in non-anthraquinoid dyestuffs or, in particular, dyestuff intermediates which contain at least one group of the general formula

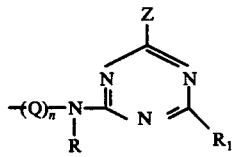

(XIV)

in which R, $R_1$, Q and n have the same meaning as above and Z represents a radical which can be split off as anion, with the exception of a fluoro substituent, Z is exchanged in known manner for a fluoro substituent and, if dyestuff intermediates are used, these are subsequently converted into the desired final dyestuffs. The exchange of one or more substituents Z which can be split off as anions, for example, of Cl- or Br-atoms, for fluoro substituents can be carried out, for example, in the manner already explained.

As has already been mentioned for some cases, the non-anthraquinoid dyestuffs obtainable by the various methods described above can be subjected to further reactions which are customary for dyestuffs in that, for example, metallisable dyestuffs are treated with metal-yielding agents, especially wih chromium, cobalt, copper or nickel salts; dyestuffs containing reducible groups, especially nitro groups, are reduced; dyestuffs containing acylatable groups, especially acylatable amino groups, are acylated; or dyestuffs are subsequently treated with sulphonating agents, such as chlorosulphonic acid, oleum or $SO_3$, in chlorinated hydrocarbons, in order to introduce (further) sulphonic acid groups into the products. The last-mentioned process is sometimes of particular importance in the series of phthalocyanine dyestuffs. Dyestuffs of the formula (I) which contain sulphonic acid and/or carboxylic acid groups are preferred within the scope of the present invention.

Depending upon the number of reactive -HNR-groupings suitable for the conversion reaction which are present in the dyestuff radical or dyestuff intermediates, one or more groupings of the general formula (II) can be incorporated with the dyestuffs. In the majority of cases the number m = 4 will not be exceeded, but it is also possible to synthetise dyestuffs, especially those of a higher molecular structure, with more than 4, e.g. with up to 8 groupings of the formula (II).

If the dyestuffs produced according to process contain groups forming metal complexes, these can be converted into their metal complex compounds by the action of metal-yielding agents, for example, of copper, nickel, chromium or cobalt salts. They can also be subjected to other conventional conversion reactions, such as diazotisation, coupling, acylation and condensation reactions.

The reaction of non-anthraquinoid dyestuffs containing amino groups with reactive components of the formula (XII) yields groups of particularly preferred dyestuffs, if those amino group-containing starting dyestuffs are used, from which the dyestuffs of the formulae (IV) to (XI) are derived, i.e. those containing the grouping —N(R')—H, instead of the group

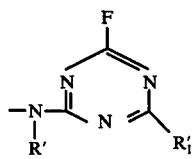

or the group —N(R')—A.

In the production of phthalocyanine dyestuffs it is possible to prepare first a diaminoaryl compound which is monocondensed with the reactive component (XII) and subsequently to condense this with, preferably, copper- or nickel-phthalocyanine-sulphonic acid halides; other amino compounds, such as ammonia, aliphatic amino compounds and/or aromatic amino compounds may be added simultaneously or subsequently. In this way, there are obtained phthalocyanine-, preferably copper- or nickel-phthalocyanine-sulphonamide dyestuffs which contain a certain proportion of sulphonarylamide groups carrying the reactive group and, in addition, a certain proportion of non-reactive sulphonamide groups and/or free sulphonic acid groups. Likewise, copper- or nickel-phthalocyanine-sulphonic acid-(aminoaryl)-amides which may contain additional, optionally N-substituted sulphonamide groups of different type and free sulphonic acid groups, can be condensed on the amino group of the aminoaryl radical with reactive components (XII) to form the new dyestuffs (I).

The new dyestuffs are extremely valuable products which are suitable for a great variety of applications. As water-soluble compounds they are primarily of interest for the dyeing of textile materials containing hydroxyl groups and containing nitrogen, especially textile materials of natural and regenerated cellulose, and also of wool, silk, synthetic polyamide and polyurethane fibres. Due to the reactive fluoro substituent or substituents in the triazine ring, the products are particularly well suited as reactive dyestuffs for the dyeing of cellulose materials by the methods which have recently become known for this purpose. The fastness properties obtained, especially the fastness to wet processing, are excellent.

For dyeing cellulose, the dyestuffs are preferably used in an aqueous solution to which compounds of alkaline reaction, such as alkali metal hydroxide or alkali metal carbonate, or compounds which can be converted into substances of alkaline reaction, such as alkali metal bicarbonate, $Cl_3C$—COONa, can be added. Further auxiliaries may be added to the solution, but these should not react with the dyestuffs in an undesirable manner. Additives of this kind are, for example, surface-active substances, such as alkylsulphates; substances preventing the migration of the dyestuff; dyeing auxiliaries such as urea; or inert thickening agents, such as oil-in-water emulsions, tragacanth, starch, alginate or methyl cellulose.

The solutions or pastes thus prepared are applied to the material to be dyed, for example, by padding on a foulard (short bath) or by printing, followed by heating for some time at an elevated temperature, preferably 40° to 150° C. Heating can be carried out in a hot flue, in a steaming apparatus, on heated rollers or by introducing the material into heated concentrated salt baths, alone or successively in any sequence.

If a padding liquor or dyebath without alkali is used, the dry material is subsequently passed through a solution of alkaline reaction to which common salt or Glauber's salt has been added. The addition of salt prevents the dyestuff from migrating from the fibre.

The material to be dyed can also be previously treated with one of the acid-binding agents mentioned above, subsequently treated with the solution or paste of the dyestuff and finally fixed at an elevated temperature as stated.

For dyeing from a long bath, the material is introduced into an aqueous solution of the dyestuff (liquor ratio 1:5 to 1:40) at room temperature and dyeing is carried out for 40 to 90 minutes, possibly with an increase of temperature up to 20° to 60° C., while adding portions of salt, for example, sodium sulphate, and subsequently of alkali, for example, sodium phosphates, sodium carbonate, NaOH or KOH. The chemical reaction between the dyestuff and the fibre takes place during this operation. After chemical fixation, the dyed material is rinsed hot and finally soaped, whereby unfixed residues of the dyestuff are removed. Dyeings of excellent fastness, especially fastness to wet processing and light, are obtained.

In the so-called cold batch padding process, the subsequent heating of the padded fabric can be saved by storing the fabric at room temperature for some time, for example 2 to 20 hours. In this process there is used a stronger alkali than in the dyeing process from a long bath described above.

For printing materials containing hydroxyl groups, there is used a printing paste consisting of the dyestuff solution, a thickening agent, such as sodium alginate, and a compound of alkaline reaction or splitting off alkali upon heating, such as sodium carbonate, sodium phosphate, potassium carbonate, potassium acetate or sodium or potassium hydrogen carbonate, and the printed material is rinsed and soaped.

If the dyestuffs contain groupings forming metal complexes, the fastness properties of the dyeings and prints can frequently be improved by an after-treatment with metal-yielding agents, such as copper salts, for example, copper sulphate, chromium, cobalt or nickel salts, such as chromium acetate, cobalt sulphate or nickel sulphate.

Textile materials containing amide groups, such as wool, silk, synthetic polyamide and polyurethane fibres, are generally dyed by the dyeing methods customarily used for this purpose in the acid to neutral range, a final increase of the pH value of the dyebath, for example, to pH 7 to pH 9, being sometimes of advantage.

For example, the dyestuffs are applied to wool and silk in the form of solutions and to synthetic polyamide fabrics as solutions or, preferably, in dispersed form and subsequently after-treated, optionally together with preferably smaller amounts of acid-binding agents, such as sodium carbonate. Particularly advantageous results are achieved on synthetic superpolyamides with those dyestuffs which are insoluble or only sparingly soluble in water. These are worked up by usual methods and with the addition of the known auxiliaries to form a dyestuff dispersion and are applied in this form in the dye bath and/or padding liquor or in a printing paste. Auxiliaries suitable for this application are, inter alia, compounds which prevent the migration of the dyestuff on the fibre, such as cellulose ethers, alkali metal chlorides and sulphates; wetting agents, such as condensation products from ethylene oxide and fatty alcohols or phenols, sulphonated fatty alcohols; solvents, such as thiodiglycol; and also thickening agents, such as starch, tragacanth, alginate thickening, gum Arabic etc.

The after-treatment of the dyeings, impregnations and prints obtained on fabrics of polyamide fibres is preferably carried out at a temperature of 50° to 110° C. for 5 to 60 minutes. In the case where the dyestuffs used contain groupings forming metal complexes, the fastness properties of the dyeings can again sometimes be improved with metal-yielding agents, such as copper salts, for example, copper sulphate, or chromium, cobalt and nickel salts, such as chromium acetate, cobalt sulphate or nickel sulphate.

The dyeings which can be obtained with the new dyestuffs are generally characterised by good to very good fastness properties, especially by excellent fastness to wet processing.

In the following Examples the parts are parts by weight, unless otherwise stated.

EXAMPLE 1

To a solution of 34.7 parts of the sodium salt of 2-aminonaphthalene-4,8-disulphonic acid and 7 parts sodium nitrite in 300 parts of water there are added 28 parts by volume of concentrated hydrochloric acid, while cooling with ice, and the mixture is stirred at 0°–10° C. for one-half hour. After removing the excess nitrogen acid, 10.7 parts 3-amino-toluene dissolved in 10 parts by volume of concentrated hydrochloric acid and 150 parts of water are added and the coupling is completed by neutralising the mixture to pH 3 to 5. The resultant aminoazo dyestuff is salted out, filtered off with suction, washed and then redissolved at pH 7 in 1400 parts of water and 100 parts acetone with the addition of a sodium hydroxide solution. 22 Parts 2,4-difluoro-6-$\beta$-methoxyethoxy-triazine are added dropwise to this solution at 0° to 10° C. and a pH of 6 to 6.5 is maintained by means of a 2N sodium hydroxide solution. When the reaction is completed, the resultant dyestuff of the presumable formula

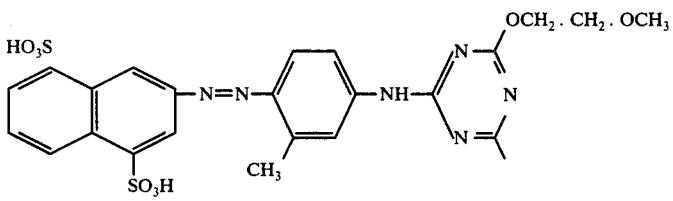

is salted out with sodium chloride, the product so obtained is filtered off with suction, washed with a 2% sodium chloride solution and dried in a vacuum at 50° C.

When a cellulose fabric is printed with a printing paste which contains, per kilogram, 15 g of the dyestuff, 100 g urea, 300 ml of water, 500 g of alginate thickening (60 g sodium alginate per kg of thickening) and 20 g sodium carbonate, and which has been made up with water to 1 kilogram, the fabric is then dried, steamed at 100° C. for 2 minutes, rinsed with hot water and soaped at the boil, an intense reddish yellow print of good fastness to washing and light is obtained.

EXAMPLE 2

0.1 Mole of the copper complex compound of the formula

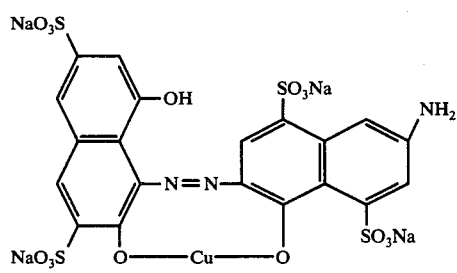

(prepared according to the instructions of German Patent Specification No. 1,117,235 by coupling diazotised 1-amino-8-(benzene-sulphonyloxy)-naphthalene-disulphonic acid-(3,6) in a soda-alkaline medium with the equivalent amount of 2-acetylamino-5-hydroxynaphthalene-disulphonic acid-(4,8), conversion of the monoazo compound into the copper complex by oxidative coppering, the hydrolysis of the acetyl and benzene-sulphonyl groups) is dissolved at pH 6–6.5 in 2500 parts by volume of water at 60°–65° C. and mixed at 10° to 20° C. with 0.11 mole 2,4-difluoro-6-methylmercapto-triazine. A pH of 6 to 7 is maintained during the condensation by the addition of a sodium carbonate solution. When the reaction is completed, the dyestuff is salted out and isolated. When dried, the dyestuff is a dark powder which dissolves in water with a blue colour.

100 Parts by weight of a cotton fabric are treated on the foulard at room temperature with an aqueous solution containing 2% of the dyestuff, 15 g/liter of sodium hydrogen carbonate and 150 g/liter of urea, subjected to intermediate drying, heated at 140° C. for 30 seconds, then rinsed and soaped at the boil. The fabric is dyed in very clear blue shades fast to wet processing.

EXAMPLE 3

46 Parts of the monoazo dyestuff obtained in analogy with Example 1 by coupling diazotised 2-aminonaphthalene-4,8-disulphonic acid with 3-methylamino-toluene are dissolved at 20° to 30° C. in 400 parts of water and 100 parts acetone, and 22 parts 2,4-difluoro-6-methoxy-triazine are added while maintaining a pH of 6 to 7 by means of a 2N sodium carbonate solution; the condensation is continued until a sample no longer exhibits a change of colour when acidified. The resultant dyestuff which has the presumable formula

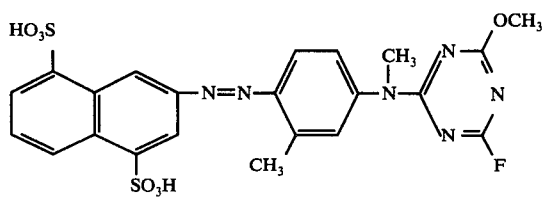

is salted out, filtered off with suction, washed and dried at 30° C. in a vacuum.

A cotton fabric is impregnated with a solution at 20°–25° C., which contains, per liter of liquor, 20 g of the above dyestuff and 0.5 g of a non-ionic wetting agent (e.g. a polyhydroxyethylated oleyl alcohol) as well as 150 g urea and 15 g sodium bicarbonate. The fabric is subsequently squeezed between two rubber rolls to a moisture content of about 100%. After an intermediate drying at 50° to 60° C., the fabric is heated at 140° C. for 30 seconds, the dyeing so obtained is thoroughly rinsed with hot water and treated at the boil for 20 minutes with a solution containing, per liter, 5 g of Marseilles soap and 2 g sodium carbonate. After rinsing and drying, there is obtained an intense reddish yellow dyeing of good fastness to wet processing, rubbing and light.

In the following Table there are listed the diazo components, coupling components and reactive components linkable to the amino group, from which dyestuffs can be synthesized in analogy with the instructions given in Examples 1 and 2, the shades — obtained by one of the methods of application described above — being likewise stated in the Table.

Abbreviations for the reactive components:
A = 2,4-difluoro-6-methoxy-triazine
B = 2,4-difluoro-6-methylmercapto-triazine

| Diazo component | Coupling component | Reactive component | Shade |
|---|---|---|---|
| 2-aminonaphthalene-4,8-disulphonic acid | 1-amino-2-methoxy-5-methylbenzene | A | yellow |
| " | " | B | " |
| 1-aminonaphthalene-3,6-disulphonic acid | 1-amino-3-methyl-benzene | A | " |
| " | " | B | " |
| 2-aminonaphthalene-5,7-disulphonic acid | " | A | " |
| " | " | B | " |
| 2-aminonaphthalene-6,8-disulphonic acid | 1-amino-3-methyl-benzene | A | " |
| " | " | B | " |
| 4-aminoazobenzene-3,4'-disulphonic acid | " | A | brown-yellow |
| 1-aminobenzene-4-sulphonic acid→ | " | B | " |

-continued

| Diazo component | Coupling component | Reactive component | Shade |
|---|---|---|---|
| 1-aminonaphthalene-6-sulphonic acid 2-(3'-sulpho-4'-aminophenyl)-6-methyl-benzothiazole-7-sulphonic acid | " | A | yellow |
| 2-aminonaphthalene-4,8-disulphonic acid | 1-methylamino-3-methoxybenzene | B | " |
| " | 1-amino-3-acetyl-aminobenzene | A | " |
| " | aniline | A | " |

EXAMPLE 4

To a solution of 36.5 parts of the sodium salt of 1-amino-8-hydroxynaphthalene-3,6-disulphonic acid in 200 parts of water there are added dropwise, at 0° to 10° C., 22 parts 2,4-difluoro-6-β-methoxyethoxy-triazine, and a pH of 5.5 to 6 is maintained by continuous neutralisation of the liberated acid. The reaction is observed by chromatography. The resultant solution of the dyestuff intermediate is poured into 900 parts of water and coupled at a pH of 7 to 8 and at 0°-5° C. with 17.5 parts of diazotised 2-aminobenzene-sulphonic acid dissolved in 200 parts of water. The product is salted out at a final pH of 6.5 with sodium chloride, filtered off with suction and washed with a 15% sodium chloride solution. Drying is carried out in a vacuum at 30° to 40° C. The dyestuff

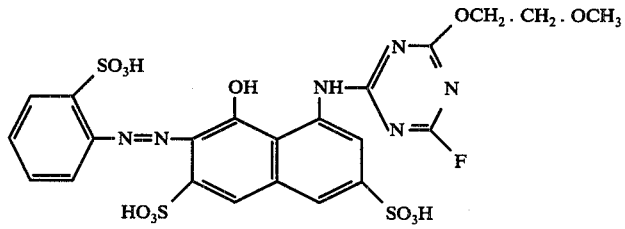

forms red small needles.

When a fabric of cotton or regenerated cellulose is dyed or printed with this dyestuff according to one of the processes described in Examples 1 to 3, clear bluish red dyeings and prints of good fastness to wet processing, rubbing and light are obtained.

Equally good results are obtained by the following method:

50 g of a cotton skein are dyed in 1 liter of a dyebath containing 1.5 g of the above dyestuff by adding 50 g sodium chloride in several portions at 20° to 30° C. within 30 minutes, subsequently adding 20 g sodium carbonate and treating the material at the same temperature for 60 minutes. After rinsing, soaping at the boil and drying, a bluish red dyeing of good fastness to wet processing, rubbing and light is obtained.

In the following Table there are listed the shades of further dyestuffs which are synthetised from the likewise specified diazo components, coupling components and reactive components linkable to the amino group in the latter, in analogy with the instructions given in Example 4 or also by reacting the corresponding aminoazo dyestuffs with the reactive components, and which can be dyed or printed on to cellulose materials by one of the methods described above Abbreviations for reactive components as in Table of Example 3.

| Diazo component | Coupling component | Reactive component | Shade |
|---|---|---|---|
| 1-aminobenzene-2-sulphonic acid | 1-amino-8-hydroxy-naphthalene-3,6-disulphonic acid | B | red |
| aminobenzene | 1-(3'-aminobenzene-amino)-8-hydroxy-naphthalene-3,6-disulphonic acid | A | " |
| " | " | B | " |
| 1-amino-2-carboxy-benzene-4-sulphonic acid | 1-amino-8-hydroxy-naphthalene-3,6-disulphonic acid | A | " |
| 1-amino-4-methyl-benzene-2-sulphonic acid | " | A | " |
| 1-amino-3-acetyl-aminobenzene-6-sulphonic acid | " | B | " |
| 1-amino-3-(2'-[4"-sulphophenylamino]-4'-chlorotriazin-1',3',5'-yl-6')-aminobenzene-6-sulphonic acid | " | A | " |
| 1-aminobenzene-2-sulphonic acid | 2-amino-5-hydroxy-naphthalene-7-sulphonic acid | A | orange |
| 1-amino-3-(2'-[4"-sulphophenylamino]-4'-methylamino-triazine-1',3',5'-yl-6')-aminobenzene-6-sulphonic acid | " | A | orange |
| 1-aminobenzene-2-sulphonic acid | " | A | orange |
| 1-amino-4-acetyl-amino-6-sulphonic acid | 2-amino-5-hydroxy-naphthalene-7-sulphonic acid | A | scarlet |
| " | 2-amino-5-hydroxy-naphthalene-7-sulphonic acid | A | " |

EXAMPLE 5

To a solution of 21 parts of the sodium salt of 1,3-diaminobenzene-6-sulphonic acid in 100 parts of water there are added with good stirring 22 parts 2,4-difluoro-6-β-methoxyethoxytriazine and the mixture is stirred at 0° to 10° C., while continuously neutralising the liberated hydrofluoric acid to pH 6 to 6.5, until a sample which is diazotised and coupled with 1-hydroxynaphthalene-4-sulphonic acid yields a clear yellowish red coloration. The resultant dyestuff intermediate is directly diazotised, after the addition of ice, with 7 parts sodium nitrite and 28 parts of concentrated hydrochloric acid and subsequently combined with a previously prepared solution of 47 parts of the sodium salt of 1-benzoyl-amino-8-hydroxynaphthalene-3,6-disulphonic acid and 12 parts sodium carbonate in 200 parts of water, whereby coupling takes place to give the dyestuff of the formula

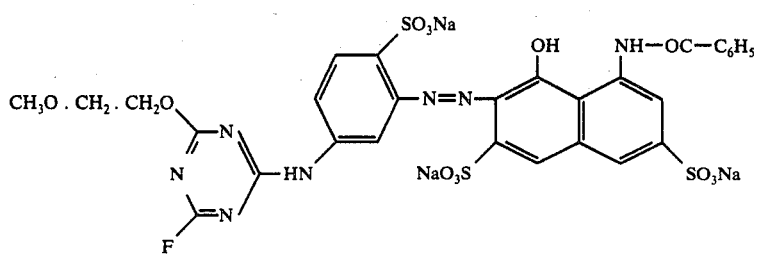

which is salted out, filtered off with suction, washed and dried at 30° to 40° C. in a vacuum. The dyestuff readily dissolves in water with a red colour and yields on cellulose materials by one of the processes described above clear bluish red dyeings and prints.

In the following Table there are listed the shades and the pH value of the coupling medium of dyestuffs which are prepared in analogy with the instructions of Example 5 from a diazo component containing a further, preferably acylatable amino group, from a coupling component and from a reactive component linkable to the diazo component. The methods described above can be used for dyeing and printing cellulose materials with the dyestuffs of the Table.

Abbreviations for reactive components as in Table of Example 3.

| Diazo component | Coupling component | Reactive component | pH of coupling medium | Shade |
|---|---|---|---|---|
| 1,3-diaminobenzene-4-sulphonic acid | 2-aminonaphthalene-5,7-disulphonic acid | A | 4–5 | orange |
| " | 2-aminonaphthalene-3,6-disulphonic acid | A | 4–5 | " |
| " | 2-aminonaphthalene-6-sulphonic acid | B | 4–5 | " |
| " | 2-N-methylamino-8-hydroxynaphthalene-6-sulphonic acid | A | 4–5 | " |
| " | 1-(3′,5′-dichloro-1′,2′-thiazole-4′-carbonamido)-8-hydroxynaphthalene-3,6-disulphonic acid | A | 7–8 | red |
| " | 1-(2′,4′-dihydroxy-triazin-1′,3′,5′-yl-6′-amino)-8-hydroxynaphthalene-3,6-disulphonic acid | B | 7–8 | " |
| " | 2-hydroxynaphthalene-3,6-disulphonic acid | A | 8 | scarlet |
| 1,3-diaminobenzene-4-sulphonic acid | 1-(3′-sulphophenyl)-3-methyl-pyrazolone-5 | A | 6 | yellow |
| " | 1-(2′,5′-dichloro-4′-sulphophenyl)-3-methyl-pyrazolone-5 | A | 6 | yellow |
| " | 1-(5′,7′-disulpho-naphthyl-2′-)-3-methyl-pyrazolone-5 | A | 6 | " |
| " | 1-(3′-sulphophenyl)-3-methyl-5-amino-pyrazole | B | 6 | " |
| 1,4-diaminobenzene-3-sulphonic acid | 2-amino-8-hydroxynaphthalene-6-sulphonic acid | A | 4–4.5 | red |
| " | 2-acetylamino-5-hydroxy-naphthalene-7-sulphonic acid | A | 6–7 | scarlet |
| " | 1-acetylamino-5-hydroxy-naphthalene-7-sulphonic acid | B | 6–7 | red |

EXAMPLE 6

51.6 Parts of the dyestuff of the formula

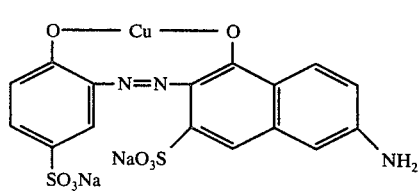

obtained by diazotisation of 1-hydroxy-2-aminobenzene-4-sulphonic acid and coupling with 2-amino-5-hydroxynaphthalene-7-sulphonic acid in water/pyridine in the presence of sodium carbonate and subsequent treatment with a copper-yielding agent, are dissolved at pH 7 in 1500 parts of water. 20 Parts 2,4-difluoro-6-methoxy-triazine are added at 20° to 30° C. with good stirring, and the liberated hydrofluoric acid is continuously neutralised to a pH of 6 to 6.5 by means of a sodium carbonate solution. When free amino groups can no longer be detected, the resultants reactive dyestuff of the formula

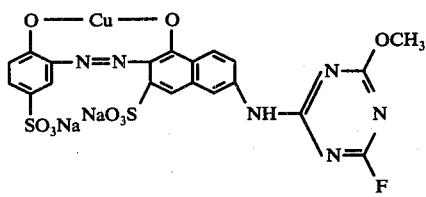

is salted out, pressed off, washed and dried in a vacuum at 30° to 40° C. Fabrics of cellulose materials can be dyed or printed with this dyestuff by one of the methods described above in ruby shades fast to wet processing, rubbing and light.

In the following Table there are listed the heavy metal complexes of further aminoazo dyestuffs and the reactive components linkable to the amino group, as well as the shades of these dyestuffs on cellulose materials. The preparation of the aminoazo dyestuffs and their metal complexes and the reaction thereof with the reactive components can be carried out in analogy with the instructions of Example 6.

Abbreviations for reactive components as in Table of Example 3.

| Aminoazo dyestuff | Complex linked heavy metal | Reactive component | Shade |
| --- | --- | --- | --- |
| 1-hydroxy-2-aminobenzene-4,6-disulphonic acid → 2-amino-5-hydroxynaphthalene-7-sulphonic acid | Cu | A | ruby |
| 1-hydroxy-2-aminobenzene-4-sulphonic acid → 2-ethylamino-5-hydroxynaphthalene-7-sulphonic acid | Cu | A | ruby |
| 1-amino-2-hydroxy-6-nitro-naphthalene-4-sulphonic acid → 2-amino-5-hydroxynaphthalene-7-sulphonic acid | Cu | A | " |
| " | Cr | A | greenish grey |
| 1-amino-2-hydroxy-6-nitronaphthalene-4-sulphonic acid → 1-amino-8-hydroxynaphthalene-4-sulphonic acid | Co | B | reddish black |
| 1-amino-2-hydroxy-5-methylsulphonyl-benzene | Cu | A | violet |
| → 1-amino-8-hydroxy-naphthalene-3,6-disulphonic acid | | | |
| " | Co | A | grey |
| " | Cr | A | greenish black |
| 1-amino-2-methylbenzene-4-sulphonic acid → 1-amino-2-hydroxy-5-methylbenzene → 1-amino-8-hydroxynaphthalene-4,6-disulphonic acid | Cu | B | blue |
| " | Co | B | grey |
| " | Cr | A | greenish black |
| (1-amino-2-chlorobenzene-4-sulphonic acid → 1-hydroxy-2-acetylaminobenzene), hydrolysed, → 1-amino-8-hydroxynaphthalene-3,6-disulphonic acid | Cu | A | navy blue |
| " | Co | A | grey |
| 1-amino-8-hydroxynaphthalene-4-sulphonic acid ← 1-hydroxy-2,6-diaminobenzene-4-sulphonic acid → 1,3-dihydroxybenzene | Co | A | black |
| 1-amino-8-hydroxynaphthalene-3,6-disulphonic acid ← 1-hydroxy-2,6-diaminobenzene-4-sulphonic acid → 2-hydroxynaphthalene | Co | A | black |
| 1-amino-8-hydroxynaphthalene-4-sulphonic acid ← 1-hydroxy-2,6-diaminobenzene-4-sulphonic acid → 3-methyl-pyrazolone-(5) | Co | A | " |

EXAMPLE 7

96 Parts (referred to 100% goods) of the copper-phthalocyanine tetrasulphochloride freshly prepared in the usual manner by the reaction of chlorosulphonic acid and thionyl chloride with copper-phthalocyanine, or of the isomeric copper-phthalocyanine tetrasulphochloride synthetised from 1-sulphobenzene-3,4-dicarboxylic acid via the corresponding copper-phthalocyanine-tetrasulphonic acid, are suspended in the form of the moist, thoroughly washed filter cake in 500 parts of water and 500 parts of ice, a solution of 50 parts 1,3-diamino-benzene in 500 parts of water is added and the pH is adjusted to 8.5 by means of sodium carbonate. The suspension is stirred at room temperature for 24 hours and the pH is constantly maintained at 8.5 by the continuous addition of sodium carbonate. The resultant condensation product is precipitated at pH 1 to 2 by the addition of sodium chloride, filtered off with suction, washed and then redissolved neutral in 1000 parts of water. 65 Parts 2,4-difluoro-6-β-methoxyethoxy-triazine are introduced into the blue solution with intense stirring, and the mixture is stirred at 0° to 10° C., while continuously neutralising to pH 6 by means of a sodium carbonate solution, until free amino groups can no longer be detected. The reactive dyestuff of the formula

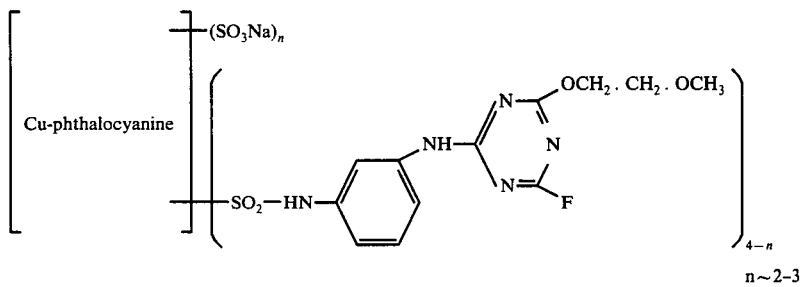

n~2-3 so obtained is salted out, washed and dried at 30° to 40° C. in a vacuum. It is a dark-blue powder which dissolves in water with a blue colour and dyes cotton and regenerated cellulose by one of the dyeing or printing processes described above in clear blue shades of good fastness to wet processing, rubbing and light.

Instead of the 96 parts copper-phthalocyanine tetrasulphochloride, there may be used — in a process which is otherwise the same as in Example 7-87 parts (referred to 100% goods) of the copper- or nickel-phthalocyanine trisulphochloride obtained by the reaction of chlorosulphonic acid with copper- or nickel-phthalocyanine, in the form of the moist filter cake thoroughly washed with ice-water; reactive dyestuffs dyeing in clear blue shades are then likewise obtained.

By working as described in Example 7, but starting from 87 parts copper-phthalocyanine trisulphochloride and replacing the 50 parts of the sodium salt of 1,3-diaminobenzene-4-sulphonic acid with 90 parts of the sodium salt of 4,4'-diaminodiphenyl-2,2'-disulphonic acid or 90 parts of the sodium salt of 4,4'-diaminostilbene-2,2'-disulphonic acid, there are likewise obtained reactive dyestuffs which dye cellulose materials by one of the methods described above in clear blue shades fast to wet processing, rubbing and light.

If 4',4'',4''',4''''-tetraphenyl-Cu-phthalocyanine is used as starting material, there is obtained, after sulphochlorination, reaction with 1,3-phenylene-diamine and acylation with 2,4-difluoro-6-methoxy-triazine, a reactive dyestuff which dyes cellulose materials in the presence of acid-binding agents in clear green shades fast to wet processing and light.

EXAMPLE 8

38.9 Parts of the dyestuff obtained by soda-alkaline coupling from 6-nitro-2-diazo-1-hydroxybenzene-4-sulphonic acid and 2-hydroxynaphthalene are stirred in 200 parts of water at pH 8 and a temperature of 70° to 80° C. This suspension is admixed with 67.9 parts of the chromium complex compound (containing 1 chromium atom per dyestuff molecule) of the azo dyestuff obtained from 4-chloro-2-diazo-1-hydroxybenzene-6-sulphonic acid and 1-amino-8-hydroxynaphthalene-3,6-disulphonic acid, the pH being kept between 7 and 9 by the dropwise addition of a sodium carbonate solution. A dark-blue solution has formed after 20 minutes at 70° to 80° C. The paper chromatogram shows that a uniform mixed complex has formed. The mixed complex is acylated within one hour at 20° C. and pH 6 to 7 with 25 parts 2,4-difluoro-6-$\beta$-methoxyethoxy-triazine, the pH being kept within the stated range by the dropwise addition of a sodium carbonate solution. The acylated dyestuff is salted out with 20% potassium chloride, filtered off and dried at 30° C. A dark powder is obtained which dissolves in water to give a blue-grey colour.

In the form of the pentasodium salt the dyestuff corresponds to the formula

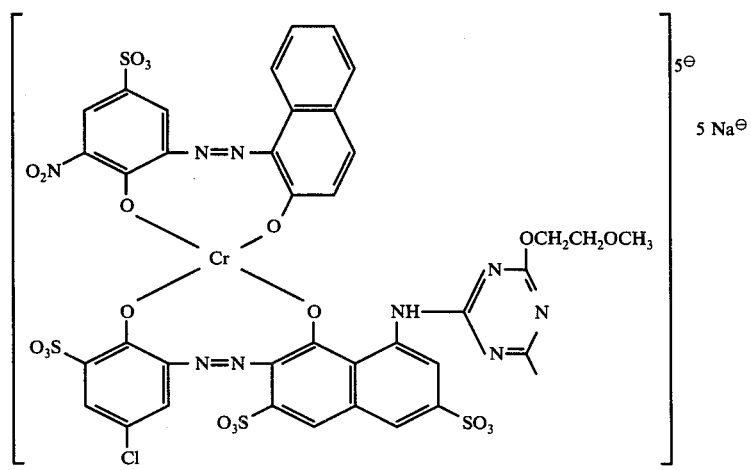

it dyes cotton by the methods described in Examples 1 to 3 in grey to black shades.

Valuable dyestuffs can also be obtained in the manner described in the present Example from the starting components stated in the following Table. For the preparation of these dyestuffs the azo dyestuff carrying the reactive group in the 2 : 1 mixed complex was always used as 1 : 1 chromium complex.

| 1:1 chromium complex | metal free dyestuff | shade on cotton |
| --- | --- | --- |
| 4-nitro-2-amino-1-hydroxybenzene-6-sulphonic acid → 1-amino-8-hydroxy-naphthalene-3,6-disulphonic acid | 4-nitro-2-amino-1-hydroxybenzene → 2-hydroxynaphthalene | black |
| " | 4-nitro-2-amino-1-hydroxybenzene → 2-hydroxynaphthalene-6-sulphonic acid | " |
| 4-nitro-2-amino-1-hydroxybenzene-6-sulphonic acid → 1-amino-8-hydroxy-naphthalene-3,6-disulphonic acid | 4-nitro-2-amino-1-hydroxybenzene → 1-hydroxynaphthalene-4-sulphonic acid | navy blue |
| " | 6-nitro-2-amino-1-hydroxybenzene-4-sulphonic acid → 2-hydroxynaphthalene | black |
| " | 4-nitro-2-amino-1-hydroxybenzene → 1-acetylamino-7-hydroxynaphthalene | " |
| " | 6-nitro-1-amino-2-hydroxynaphthalene-4-sulphonic acid → 2-hydroxynaphthalene | " |
| 4-nitro-2-amino-1-hydroxybenzene-6-sulphonic acid → 1-amino-8-hydroxy-naphthalene-4,6-disulphonic acid | 4-nitro-2-amino-1-hydroxynaphthalene-6-sulphonic acid → 2-hydroxynaphthalene | " |
| 4-chloro-2-amino-1-hydroxybenzene-6-sulphonic acid → 1-amino-8-hydroxy-naphthalene-3,6-disulphonic acid | 4-nitro-2-amino-1-hydroxybenzene → 2-hydroxynaphthalene | blue-black |
| " | 4-nitro-2-amino-1-hydroxybenzene → 2-hydroxynaphthalene-6-sulphonic acid | blue-black |
| " | 4-chloro-2-amino-1-hydroxybenzene → 2-hydroxynaphthalene | navy blue |
| " | 4-nitro-2-amino-1-hydroxybenzene → 1-acetylamino-8-hydroxynaphthalene-3,6-disulphonic acid | blue |
| " | 4-nitro-2-amino-1-hydroxybenzene → 1-amino-8-hydroxy-naphthalene-2,4-disulphonic acid | navy blue |
| 4-chloro-2-amino-1-hydroxybenzene-6-sulphonic acid → 1-amino-8-hydroxy-naphthalene-3,6-disulphonic acid | 6-nitro-1-amino-2-hydroxynaphthalene-4-sulphonic acid → 2-hydroxynaphthalene | blue-black |
| " | 2-aminobenzene-1-carboxylic acid-5-sulphonic acid → 1-phenyl-3-methyl-5-pyrazolone | grey-green |
| 4-nitro-2-amino-1-hydroxybenzene-6-sulphonic acid → 1-amino-8-hydroxy-naphthalene-3,6-disulphonic acid | 6-nitro-1-amino-2-hydroxynaphthalene-4-sulphonic acid → 2-hydroxynaphthalene | black |
| 4-chloro-2-amino-1-hydroxybenzene-6-sulphonic acid → 1-amino-8-hydroxy-naphthalene-3,6-disulphonic acid | 4-chloro-2-amino-1-hydroxybenzene → 1-(4'-sulphophenyl)-3-methyl-5-pyrazolone | violet |
| 4-methyl-2-amino-1-hydroxybenzene-6-sulphonic acid → 1-amino-8-hydroxy-naphthalene-3,6-disulphonic acid | 4-chloro-2-amino-1-hydroxybenzene → 2-hydroxynaphthalene-6-sulphonic acid | reddish blue |
| 4-nitro-2-amino-1-hydroxybenzene-6-sulphonic acid → 1-amino-8-hydroxy- | 5-nitro-2-amino-1-hydroxybenzene → 2-hydroxynaphthalene-6-sulphonic acid | black |

-continued

| 1:1 chromium complex | metal free dyestuff | shade on cotton |
| --- | --- | --- |
| naphthalene-3,6-disulphonic acid | | |
| " | 4-nitro-2-amino-1-hydroxybenzene → 2-hydroxynaphthalene-8-sulphonic acid | " |
| " | 4-nitro-2-amino-1-hydroxybenzene → 1-hydroxynaphthalene-5-sulphonic acid | " |
| " | 6-nitro-4-chloro-1-hydroxybenzene → 1-hydroxynaphthalene-5-sulphonic acid | " |

EXAMPLE 9

If the procedure described in Example 6 is followed but, instead of the copper-containing amino-monoazo dyestuff there used, the equivalent amount of the chromium complex of the aminoazo dyestuff obtained by coupling diazotised 1-amino-2-hydroxy-3-chlorobenzene-5-sulphonic acid with 1-[3'-(3''-aminophenyl)]sulphonylimido-sulphonyl-phenyl-3-methyl-pyrazolone-(5) is used as starting material, then a reactive dyestuff is obtained, which dyes cellulose materials by one of the methods described above in yellow-brown shades of good fastness to wet processing, rubbing and light.

EXAMPLE 10

0.1 Mole of the copper complex compound of the formula

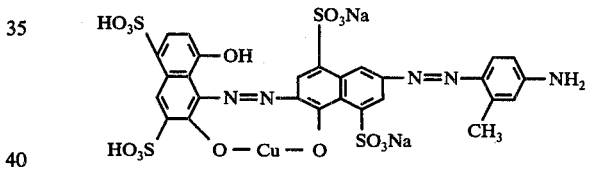

is dissolved in 3000 parts by volume of water at pH 6 and combined at a temperature of 20° to 30° C., while stirring, with 20 parts 2,4-difluoro-6-methoxy-triazine, a pH of 6 being maintained by means of a 2N potassium carbonate solution. The mixture is stirred until the condensation is completed, the dyestuff is separated by the addition of a little sodium chloride and isolated. The residue is washed with acetone and dried at room temperature under reduced pressure. A dark powder is obtained, which dissolves in water with a green colour and dyes cotton by the methods described in Examples 1 to 3 in green shades.

A cotton fabric is impregnated with a solution at 20°–25° C. containing, per liter, 25 g of the above dyestuff and 0.5 g of a non-ionic wetting agent (e.g. a polyethoxylated oleyl alcohol), 150 g urea and 20 g sodium carbonate. The fabric is subsequently squeezed between two rubber rollers to a moisture content of about 100%. After an intermediate drying at 50°–60° C., the fabric is heated at 140° C. for 15 seconds, the dyeing so obtained is thoroughly rinsed with hot water and treated for 20 minutes at the boil with a solution containing, per liter, 5 g of Marseilles soap and 2 g sodium carbonate. After rinsing and drying, there is obtained a green dyeing of good fastness to wet processing, rubbing and light.

Clear green shades of good fastness properties are also obtained on materials of cellulose by one of the other dyeing or printing methods described in Examples 1 to 5.

EXAMPLE 11

0.1 Mole of the paste of the aminoazo compound of the formula

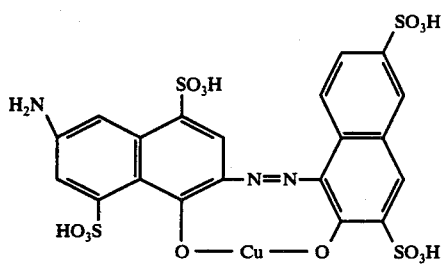

which is obtained by coupling the diazonium compound of 6-acetamino-2-aminonaphthalene-4,8-disulphonic acid with 2-hydroxy-naphthalene-3,6-disulphonic acid, hydrolysis and conversion of the monoazo compound into the copper complex, is dissolved in 2000 parts by volume of water at pH 6.5 and combined with 26 parts 2,4-difluoro-6-phenylamino-triazine. The reaction mixture is stirred at 20° to 30° C. until the condensation is completed, the pH of the reaction solution being maintained at 6 to 7 by the addition of a sodium carbonate solution. When the reaction is completed, the dyestuff is salted out, isolated and dried in a vacuum.

The dried dyestuff is a dark powder which dissolves in water with a violet colour and dyes cotton in the presence of alkali in bluish violet shades.

EXAMPLE 12

An aqueous solution of 0.1 Mole of the copper complex of the formula

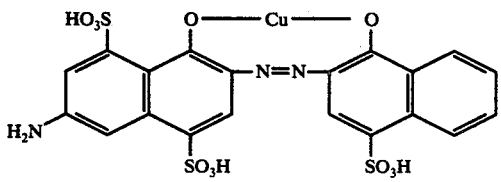

prepared according to the instructions of German Patent Nos. 1,061,460 or 1,085,988, is reacted in the usual manner with 0.1 part 2,4-difluoro-6-(4'-sulphophenylamino)-triazine. A pH of 6 to 7 is maintained by the addition of sodium carbonate and when the reaction is completed, the dyestuff is isolated by salting out. In the dry state the dyestuff is a dark powder which dissolves in water with a violet colour. Cotton fabric is dyed in violet shades fast to light and wet processing.

EXAMPLE 13

27.5 Parts of the sodium salt of 2-methylamino-5-hydroxynaphthalene-7-sulphonic acid are dissolved in 150 parts of water, 20 parts 2,4-difluoro-6-dimethylamino-triazine are added and the mixture is stirred at 20° C., while continuously neutralising the hydrogen fluoride formed to pH 6 to 7 by means of a total of 34 parts by volume of a 16% sodium carbonate solution. After a short time, the acylation is completed, the pH is 6 and changes no more.

30 Parts sodium bicarbonate are then added, and a diazo suspension from 34 parts of the disodium salt of 2-aminonaphthalene-1,7-disulphonic acid in 200 parts of water is added dropwise at 20° C. within 15 minutes. The orange-coloured reactive dyestuff of the formula

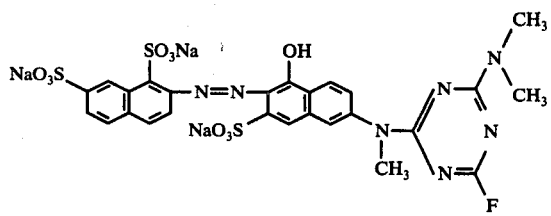

which is immediately formed, is completely separated, after further stirring for one hour, by means of 80 parts sodium chloride, filtered off, washed with a dilute sodium chloride solution and dried at 35° C. in a vacuum. The dyestuff dyes cellulose materials by the methods described above in reddish orange shades of very good fastness to wet processing and good fastness to chlorine.

Orange to red reactive dyestuffs are obtained in an analogous manner by acylating the aminonaphthol-sulphonic acids stated in Column 2 of the following Table with 2,4-difluoro-6-ethoxy-triazine and coupling the resultant acylamino-naphthalsulphonic acids with the diazo components stated in Column 1.

| Diazo component | Aminonaphthol-sulphonic acid | Shade on cotton |
|---|---|---|
| 2-aminonaphthalene-1,7-disulphonic acid | 2-ethylamino-5-hydroxy-naphthalene-7-sulphonic acid | orange |
| " | 2-(β-hydroxyethylamino-5-hydroxynaphthalene-7-sulphonic acid | " |
| " | 2-amino-5-hydroxynaphthalene-7-sulphonic acid | " |
| " | 2-amino-5-hydroxynaphthalene-1,7-disulphonic acid | " |
| 2-aminonaphthalene-1,7-disulphonic acid | 2-amino-8-hydroxynaphthalene-6-sulphonic acid | scarlet |
| " | 2-amino-8-hydroxynaphthalene-3,6-disulphonic acid | " |
| 2-aminonaphthalene-1,5-disulphonic acid | 2-methylamino-5-hydroxy-naphthalene-7-sulphonic acid | orange |
| " | 2-ethylamino-5-hydroxy-naphthalene-7-sulphonic acid | " |
| " | 2-(β-hydroxyethylamino)-5-hydroxynaphthalene-7-sulphonic acid | " |
| " | 2-amino-5-hydroxynaphthalene-7-sulphonic acid | " |
| " | 2-amino-5-hydroxynaphthalene-1,7-disulphonic acid | " |
| " | 2-amino-8-hydroxynaphthalene-6-sulphonic acid | scarlet |
| " | 2-amino-8-hydroxynaphthalene-3,6-disulphonic acid | " |
| 2-aminonaphthalene-1,5,7-trisulphonic acid | 2-amino-5-hydroxynaphthalene-7-sulphonic acid | orange |
| " | 2-methylamino-5-hydroxy-naphthalene-7-sulphonic acid | " |
| " | 2-amino-8-hydroxynaphthalene-6-sulphonic acid | scarlet |
| 2-aminobenzene-sulphonic acid | 2-(β-hydroxyethylamino)-5-hydroxynaphthalene-7-sulphonic acid | orange |
| " | 2-amino-8-hydroxynaphthalene-6-sulphonic acid | scarlet |
| " | 2-amino-8-hydroxynaphthalene-3,6-disulphonic acid | " |
| " | 2-amino-5-hydroxynaphthalene-1,7-disulphonic acid | orange |
| 2-aminonaphthalene-1-sulphonic acid | 1-amino-8-hydroxynaphthalene-3,6-disulphonic acid | bluish red |

-continued

| Diazo component | Aminonaphthol-sulphonic acid | Shade on cotton |
|---|---|---|
|  | 1-amino-8-hydroxynaphthalene-4,6-disulphonic acid | " |
| 2-aminonaphthalene-1,5-disulphonic acid | 1-amino-8-hydroxynaphthalene-3,6-disulphonic acid | bluish red |
| " | 1-amino-8-hydroxynaphthalene-4,6-disulphonic acid | " |
| " | 1-amino-8-hydroxynaphthalene-6-sulphonic acid | bluish red |
| 2-aminonaphthalene-1,7-disulphonic acid | 1-amino-8-hydroxynaphthalene-3,6-disulphonic acid | " |
| " | 1-amino-8-hydroxynaphthalene-4,6-disulphonic acid | " |
| " | 1-amino-8-hydroxynaphthalene-6-sulphonic acid | " |
| 2-aminonaphthalene-1,5,7-trisulphonic acid | 1-amino-8-hydroxynaphthalene-6-sulphonic acid | " |
| 1-amino-4-chlorobenzene-2-sulphonic acid | 1-amino-8-hydroxynaphthalene-3,6-disulphonic acid | " |
| 1-amino-2-methoxybenzene-5-sulphonic acid | 1-amino-8-hydroxynaphthalene-3,6-disulphonic acid | " |
| 1-amino-benzene-2-carboxylic acid-4-sulphonic acid | 1-amino-8-hydroxynaphthalene-3,6-disulphonic acid | " |
| 1-amino-4-acetyl-aminobenzene-2-sulphonic acid | " | violet |
| " | 1-amino-8-hydroxynaphthalene-4,6-disulphonic acid | bluish red |

EXAMPLE 14

56.8 Parts of the diamino-azo dyestuff obtained by coupling diazotised 1-amino-3-acetyl-aminobenzene-6-sulphonic acid with 2-aminonaphthalene-5,7-disulphonic acid in an acetic acid medium and subsequent alkaline or acidic hydrolysis of the acetylamino group, are dissolved at pH 7 in 450 parts of water. After the addition of 20 parts 2,4-difluoro-6-methoxy-triazine, the mixture is stirred at 20° C. for about one hour, while continuously neutralising the liberated hydrofluoric acid to pH 6 to 7 by means of a sodium carbonate solution. When the acylation is completed, the resultant reactive dyestuff which presumably corresponds to the formula

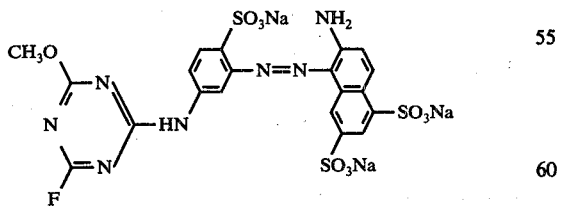

is salted out, filtered off, redissolved in 4000 parts of water at 30° C., filtered and separated from the filtrate in completely pure form by the addition of sodium chloride. The dyestuff is dried as usual at 35° C in a vacuum. It dyes cellulose materials by one of the methods described above in fast yellowish orange shades.

EXAMPLE 15

A neutral solution of 60 parts of the trisodium salt of the aminoazo dyestuff obtained by coupling diazotised 2-aminonaphthalene-3,6,8-trisulphonic acid with 3-acetylamino-aniline in an acetic acid medium, in 500 parts of water is admixed with 25 parts 2,4-difluoro-6-β-ethoxyethoxy-triazine and the mixture is stirred at 10° C. for one hour, a pH of 6 being maintained by the continuous addition of a sodium hydroxide solution. The acylation product which is partially precipitated is completely separated at pH 7 by the addition of 100 parts sodium chloride and filtered off. For purification, the reactive dyestuff so obtained can be redissolved in 2500 parts of water at 30° C., clarified and separated again by salting out the filtrate with 350 parts sodium chloride. The dyestuff has the formula

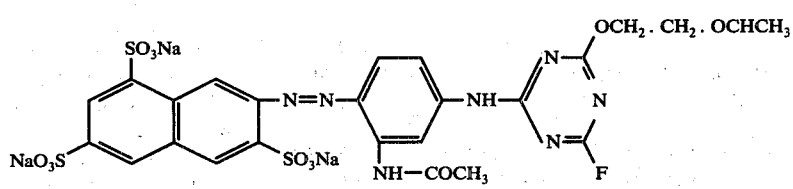

after filtering off, drying at 35° C. and grinding, it is a yellow powder which readily dissolves in water with a yellow colour and dyes cellulose fibres by one of the dyeing methods described above in the presence of acid-binding agents in very fast reddish yellow shades. Fast yellow shades are also obtained on wool and polyamide fibres.

Similar dyestuffs are obtained by following the procedure described above but replacing the 60 parts of the sodium salt of 4'-amino-2'-acetylamino-phenyl-(1')-azo-naphthalene-(2)-3,6,8-trisulphonic acid with corresponding amounts of the aminoazo dyestuffs obtained from the amino compounds stated in Column 1 and the coupling components stated in Column 2 in the usual manner by diazotisation and coupling in an acetic acid medium, and acylating with

| Diazo component | Coupling component | Shade on cotton |
|---|---|---|
| 2-aminonaphthalene 1,5-disulphonic acid | 1-amino-3-methyl-6-methoxy-benzene | strongly reddish yellow |
| " | 1-amino-3-methylbenzene | yellow |
| " | 1-aminonaphthalene-6-sulphonic acid | reddish yellow |
| " | 1-amino-3-acetylamino-benzene | " |
| " | 3-aminophenyl-urea | " |
| " | 1-amino-3-hydroxyacetyl-aminobenzene | " |
| 2-aminonaphthalene-5,7-disulphonic acid | 1-amino-3-methyl-6-methoxy-benzene | strongly reddish yellow |
| " | 1-aminonaphthalene-7-sulphonic acid | reddish yellow |
| " | 1-amino-3-acetylamino-benzene | " |
| " | 3-aminophenyl-urea | " |
| " | 1-amino-3-hydroxyacetyl-aminobenzene | " |
| 1-aminonaphthalene 3,7-disulphonic acid | 1-amino-3-methyl-6-methoxybenzene | strongly reddish yellow |
| " | 1-amino-3-methylbenzene | reddish yellow |
| " | 1-aminonaphthalene-6-sulphonic acid | reddish yellow |
| 2-aminonaphthalene-3,6-disulphonic acid | 1-amino-3-methylbenzene | " |
| " | 1-amino-3-methyl-6-methoxy-benzene | strongly reddish |

-continued

| Diazo component | Coupling component | Shade on cotton |
|---|---|---|
| " | 1-amino-3-acetylamino-benzene | yellow reddish |
| " | 3-aminophenyl-urea | yellow " |
| " | 1-amino-3-hydroxyacetyl-aminobenzene | " |
| " | 1-aminonaphthalene-6-sulphonic acid | " |
| 2-aminonaphthalene-6,8-disulphonic acid | 1-amino-3-acetylamino-benzene | " |
| " | 1-amino-2-methoxynaphthalene-6-sulphonic acid | strongly reddish yellow |
| " | 1-aminonaphthalene-6-sulphonic acid | reddish yellow |
| 2-aminonaphthalene-4,8-disulphonic acid | " | yellow |
| " | 1-aminonaphthalene-7-sulphonic acid | " |
| 2-aminonaphthalene-4,8-disulphonic acid | 1-amino-2-methoxynaphthalene-6-sulphonic acid | strongly reddish yellow |
| " | aniline | yellow |
| " | aniline | yellow |
| " | 1-ethylamino-3-methyl-benzene | " |
| " | N-methyl-aniline | " |
| " | N-ethylaniline | " |
| " | N-(β-hydroxyethyl)-aniline | " |
| " | N-butyl-aniline | " |
| 2-aminonaphthalene-3,6,8-trisulphonic acid | aniline | reddish yellow |
| " | 1-amino-3-methylbenzene | " |
| " | 3-aminophenyl-urea | " |
| " | 1-amino-3-hydroxyacetyl-aminobenzene | " |
| " | 1-amino-3-acetylamino-6-methoxybenzene | yellowish orange |
| " | 1-amino-3-acetylamino-6-methylbenzene | reddish yellow |
| " | 1-amino-3-methane-sulphonyl-aminobenzene | " |
| " | 2,5-dimethoxyaniline | yellowish orange |
| " | 3-methyl-6-methoxy-aniline | " |
| " | N-methyl-aniline | reddish yellow |
| " | N-ethyl-aniline | " |
| " | N-butyl-aniline | " |
| " | N-(β-hydroxyethyl)-aniline | " |
| " | 3-(N-ethylamino)-toluene | " |
| " | 2-aminotoluene | " |
| " | 1-amino-2,5-dimethyl-benzene | strongly reddish yellow |
| " | 1-amino-2-methoxybenzene | " |
| 2-aminonaphthalene-3,6,8-trisulphonic acid | 1-amino-3-methoxybenzene | reddish yellow |
| " | 1-ethylamino-3-methoxy-benzene | " |
| " | 1-aminonaphthalene-6-sulphonic acid | " |
| " | 1-aminonaphthalene-7-sulphonic acid | " |
| 2-aminonaphthalene-4,6,8-trisulphonic acid | 1-amino-3-methylbenzene | " |
| " | aminobenzene | " |
| " | aniline | yellow |
| " | 1-amino-3-acetylamino-benzene | reddish yellow |
| 1-aminonaphthalene-2,4,7-trisulphonic acid | 1-amino-3-methylbenzene | yellow |
| " | 1-aminonaphthalene-6- | " |

-continued

| Diazo component | Coupling component | Shade on cotton |
|---|---|---|
| | sulphonic acid | |
| 4-nitro-4'-amino-stilbene-2,2'-disulphonic acid | 1-amino-3-acetylamino-benzene | reddish yellow |
| " | 3-aminophenyl-urea | " |
| " | 1-amino-3-hydroxyacetyl-aminobenzene | " |
| " | N-methyl-aniline | " |
| " | N-ethyl-aniline | " |
| " | N-butyl-anilaniline | " |
| " | N-(β-hydroxyethyl)-aniline | " |
| " | 1-(N-ethylamino)-3-methyl-benzene | " |
| aniline-2,5-disulphonic acid | 1-aminonaphthalene-6-sulphonic acid | " |
| " | 1-aminonaphthalene-7-sulphonic acid | " |
| " | 1-amino-3-methylbenzene | yellow |
| " | 1-amino-3-acetylamino-benzene | " |
| aniline-2,6-disulphonic acid | 1-amino-2-methoxy-5-methyl-benzene | reddish yellow |
| " | 1-amino-2,5-dimethoxy-benzene | " |
| aniline-2,4-disulphonic acid | 1-amino-2-methoxy-5-methylbenzene | " |

EXAMPLE 16

65 Parts of the dyestuff of the formula

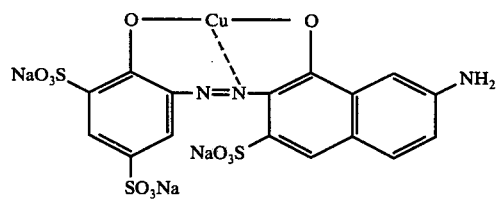

(prepared by coupling diazotised 1-hydroxy-2-amino-benzene-4,6-disulphonic acid with 2-amino-8-hydroxynaphthalene-6-sulphonic acid and coppering the resultant azo dyestuff) are dissolved neutral in 700 parts of water. 20 Parts 2,4-difluoro-6-methoxytriazine are added and the mixture is stirred at 0° to 10° C., while continuously neutralising the liberated acid to pH 6 to 7 by means of a sodium carbonate solution, until free amino groups can no longer be detected. The resultant reactive dyestuff of the formula

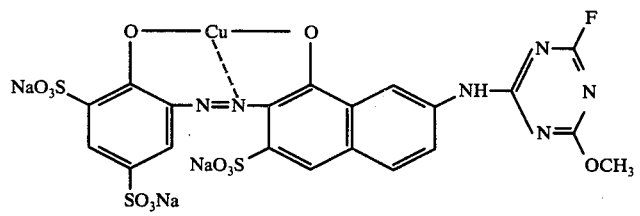

is salted out, filtered off, washed and dried at 30°–40° C. The dyestuff dyes cellulose materials by one of the methods described above is very fast ruby shades.

Dyestuffs with similar properties are obtained in analogy with the method described above from the copper complexes of the azo dyestuffs prepared from the diazo and azo components stated in the following Table.

| Diazo component | Coupling component | Shade on cotton |
|---|---|---|
| 1-hydroxy-2-amino-benzene-4-sulphonic acid | 2-methylamino-5-hydroxy-naphthalene-7-sulphonic acid | ruby |
| " | 2-ethylamino-5-hydroxy-naphthalene-7-sulphonic acid | " |
| " | 2-(β-hydroxyethylamino)-5-hydroxynaphthalene-7-sulphonic acid | " |
| " | 2-amino-8-hydroxynaphthalene-3,6-disulphonic acid | " |
| 1-hydroxy-2-amino-benzene-4,6-disulphonic acid | 2-amino-5-hydroxynaphthalene-1,7-disulphonic acid | " |
| " | 2-amino-8-hydroxynaphthalene-3,6-disulphonic acid | " |
| " | 2-methylamino-5-hydroxy-naphthalene-7-sulphonic acid | " |
| " | 2-ethylamino-5-hydroxy-naphthalene-7-sulphonic acid | " |
| " | 2-(β-hydroxyethylamino)-5-hydroxynaphthalene-7-sulphonic acid | " |
| " | 1-amino-8-hydroxynaphthalene-3,6-disulphonic acid | violet |
| " | 1-amino-8-hydroxynaphthalene-4,6-disulphonic acid | " |
| 1-hydroxy-2-amino-benzene-5-sulphonic acid | 1-amino-8-hydroxynaphthalene-3,6-disulphonic acid | " |
| " | 1-amino-8-hydroxynaphthalene-4,6-disulphonic acid | " |
| 1-hydroxy-2-amino-4-acetylaminobenzene-6-sulphonic acid | 1-amino-8-hydroxynaphthalene-3,6-disulphonic acid | bluish violet |
| 1-hydroxy-2-amino-4-acetylaminobenzene-6-sulphonic acid (4-positioned acetylamino group subsequently hydrolysed) | 1-ethoxy-8-hydroxynaphthalene-3,6-disulphonic acid | " |
| " | 1-amino-8-hydroxynaphthalene-2,4-disulphonic acid | blue |
| " | 1-amino-8-hydroxynaphthalene-2,4,6-trisulphonic acid | " |
| 1-hydroxy-2-amino-6-acetylaminobenzene-4-sulphonic acid (6-positioned acetylamino group hydrolysed) | 1-amino-8-hydroxynaphthalene-2,4-disulphonic acid | " |
| 1-amino-2-hydroxy-6-nitronaphthalene-4-sulphonic acid (6-positioned nitro group subsequently reduced to -NH₂) | " | " |
| 1-amino-2-hydroxy-6-nitronaphthalene-2,4,6-trisulphonic 4-sulphonic acid (6-positioned nitro group reduced to -NH₂) | 1-amino-8-hydroxynaphth- acid | " |
| 1-hydroxy-2-amino-6-acetylaminobenzene-4-sulphonic acid (6-positioned acetylamino group hydrolysed) | " | " |

EXAMPLE 17

The procedure is as described in Example 5 but the diazotised reactive group-containing intermediate is coupled in a soda-alkaline medium, instead of with 47 parts of the sodium salt of 1-benzoylamino-8-hydroxynaphthalene-3,6-disulphonic acid, with 40 parts of the sodium salt of 1-acetylamino-8-hydroxynaphthalene-3,6-disulphonic acid, and the resultant dyestuff of the formula

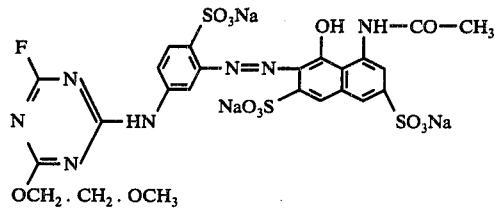

is isolated in the manner described in Example 5. The water-soluble dyestuff dyes cellulose materials by the pad-steaming or pad-thermofixing method (at 140° C.) in bluish red shades which are white dischargeable and fast to rubbing and light.

EXAMPLE 18

A solution of 19.5 parts of the sodium salt of 1-aminobenzene-4-sulphonic acid and 6.9 parts sodium nitrite in 200 parts of water is poured into a mixture of 100 parts of ice and 28 parts by volume of concentrated hydrochloric acid; the reaction mixture is then stirred for one-half hour at 0° to 10° C., and the excess nitrous acid is subsequently removed. The diazo suspension so obtained is admixed at 0° to 10° C. with a cooled and thereby partially crystallised solution of 26.2 parts of the potassium salt of 1-aminonaphthalene-8-sulphonic acid in 250 parts of hot water and the strongly acidic coupling mixture is neutralised at 10° to 20° C. to pH 4 by the careful addition of a sodium hydroxide solution. The coupling is rapidly completed; the aminoazo dyestuff formed is completely salted out with 100 parts sodium chloride, filtered off with suction, washed and redissolved in 500 parts of water at 10° C. and pH 6 to 6.5. The aqueous solution is mixed portionwise with 20 parts 2,4-difluoro-6-methylaminotriazine and stirred at 10° to 20° C., while continuously neutralising the liberated acid to pH 6 to 7 by means of a sodium carbonate solution. When the aminoazo dyestuff can no longer be detected, the reactive dyestuff of the formula

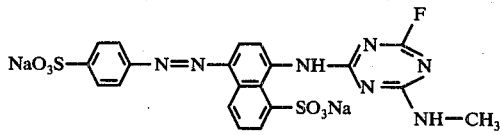

which is partially precipitated, is salted out with sodium chloride, filtered off and redissolved in 800 parts of warm water for purification. After clarification of the solution, the pure dye stuff is separated from the filtrate by the addition of sodium chloride. After filtering off, drying at 35° C. and grinding, there is obtained a yellow powder which readily dissolves in water with a yellow colour and dyes cellulose fibres by one of the dyeing methods described above in the presence of acid-binding agents in yellow shades of very good fastness to wet processing, light and chlorine. Fast yellow dyeings are also obtained on wool and polyamide fibres.

When the procedure described above is followed but, instead of 19.5 parts of the sodium salt of 1-aminobenzene-4-sulphonic acid, equivalent amounts of the diazo components stated in the following Table are coupled with 1-aminonaphthalene-8-sulphonic acid, then valuable yellow to brown reactive dyestuffs are likewise obtained after acylation with 2,4-difluoro-6-methylmercapto-triazine.

| Diazo component | Shade on cellulose fibres |
|---|---|
| 1-aminobenzene-2,5-disulphonic acid | reddish yellow |
| 2-amino-naphthalene-4,8-disulphonic acid | strongly reddish yellow |
| 2-amino-naphthalene-5,7-disulphonic acid | " |
| 2-amino-naphthalene-6,8-disulphonic acid | " |
| 2-amino-naphthalene-3,6,8-trisulphonic acid | " |
| 2-amino-naphthalene-4,6,8-trisulphonic acid | " |
| 4-amino-azobenzene-3,4'-disulphonic acid | yellowish brown |
| 4-amino-2-acetylamino-azobenzene-2',5'-disulphonic acid | orange-brown |

![structure] reddish brown (1-aminobenzene-2,5-disulphonic acid coupled in an acidic medium with 1-amino-naphthalene-6-sulphonic acid)

![structure] reddish brown (in 6- or 7-position)
(1-aminobenzene-2,5-disulphonic acid coupled in an acidic medium with the technical mixture of 1-aminonaphthalene-6- and -7-sulphonic acid)

![structure] violet-tinted brown (1-amino-naphthalene-2,5,7-trisulphonic acid coupled in an acidic medium with 1-amino-naphthalene-6-sulphonic acid)

![structure] reddish brown (1-amino-naphthalene-2,5,7-trisulphonic acid coupled in an acidic medium with 1-amino-2-methoxy-5-methylbenzene)

EXAMPLE 19

When a cellulose fabric is printed with a printing paste which contains, per kilogram, 30 g of the dyestuff described in Example 4, 100 g urea, 300 g of water, 500 g of alginate thickening agent (60 g sodium alginate per kilogram thickening agent), 10 g sodium carbonate and 10 g of the sodium salt of 3-nitrobenzene-sulphonic acid and which has been made up with water to 1 kilogram, the fabric is subsequently subjected to an intermediate drying and then steamed in a suitable steaming apparatus at 103° to 115° C. for 45 seconds, an intense bluish red print of good fastness to wet processing, rubbing and light is obtained after rinsing and soaping at the boil.

EXAMPLE 20

A mixture of the solution of 65.5 parts each of the chromium 2:1 complex and the cobalt 2:1 complex of the dyestuff of the formula

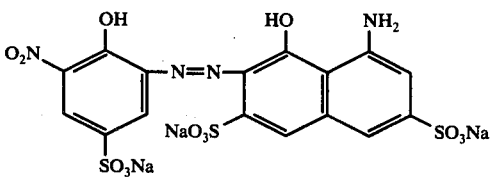

each in 400 parts of water, is stirred with 40 parts 2,4-difluoro-6-methoxy-triazine at 20° to 30° C. for about 2 hours while maintaining a pH of 6 to 7. When no more aminoazo dyestuff can be detected by chromatography (Co-complex: blue; Cr-complex: blue-green), the resultant mixture of the two reactive dyestuffs is salted out with potassium chloride, filtered off and dried.

The dyestuff yields on cellulose materials by the pad-dyeing processes or when printed in the presence of acid-binding agents, intense black shades of very good fastness to wet processing and light.

Valuable black dyestuffs are also obtained by proceeding analogously but using a mixture of the chromium 2:1 and cobalt 2:1 complexes of the following aminoazo dyestuffs:

| Diazo component | Coupling component | Coupling pH |
|---|---|---|
| 1-hydroxy-2-amino-4-nitrobenzene | 1-hydroxy-8-amino-naphthalene-3,6-disulphonic acid | 9 |
| 1-hydroxy-2-amino-4-nitronaphthalene-7-sulphonic acid | " | 9 |

EXAMPLE 21

A neutral solution of 53.1 parts of the disodium salt of the aminoazo dyestuff obtained by coupling diazotised 1-amino-4-nitrobenzene-2-sulphonic acid with 1-(2'-chloro-5'-sulphophenyl)-3-methyl-pyrazolone-(5) and subsequent reduction of the nitro group with sodium sulphide, in 300 parts of water is admixed with 30 parts 2,4-difluoro-6-β-methoxyethoxy-triazine, and the mixture is stirred at 20° C. for one hour while the liberated acid is continuously neutralised to a pH value of 6 by means of a sodium carbonate solution. The precipitated dyestuff of the formula

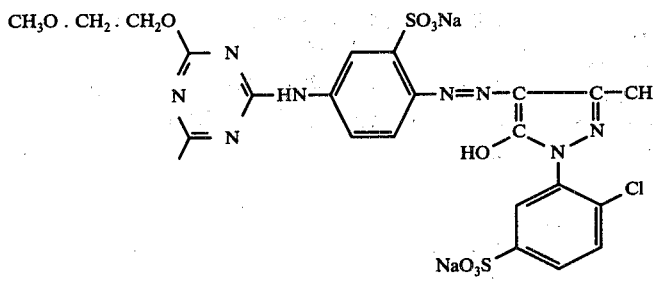

is filtered off, dissolved warm at pH 6 to 7 in 3000 parts of water, and reprecipitated from the filtered solution by the addition of sodium chloride. After filtering off, drying and pulverising, there is obtained a yellow powder which is readily water-soluble and dyes cellulose materials from a long bath at 30° C. or by the cold batch padding process with sodium carbonate as acid-binding agent in clear yellow shades fast to washing, rubbing and light.

Valuable new reactive dyestuffs are also obtained by following the procedure described above, but replacing the aminoazo dyestuff there used with equivalent amounts of the aminoazo dyestuffs synthetised from the components stated in the following Table. Unless otherwise stated, the term "hydrolysed" in the Table means that an acylamino group contained in the aminoazo dyestuff was subsequently hydrolysed, while the term "reduced" indicates that a nitro group contained in the diazo component is reduced to the amino group after the coupling, whereby the desired aminoazo dyestuff is formed.

| Diazo component | Azo component | pH of coupling medium | Shade on cellulose |
|---|---|---|---|
| 1-amino-4-nitro-benzene-2-sulphonic acid | 1-(4'-sulphophenyl)-3-methyl-pyrazolone-(5) | 5 – 6 | yellow |
| (4-positioned nitro group subsequently reduced) | | | |
| " | 1-(4'-sulphophenyl)-3-carboxy-pyrazolone-(5) | 5 – 6 | reddish yellow |
| 1-amino-4-nitro-benzene-2-sulphonic acid | 1-(3'-sulphophenyl)-3-methyl-5-amino-pyrazole | 6 – 7 | yellow |
| 1-amino-3-acetyl-amino-benzene-6-sulphonic acid | " | 6 – 7 | " |
| (3-positioned acetylamino group subsequently hydrolysed) | | | |
| " | 1-(β-hydroxyethyl)-3-methyl-pyrazolone-(5) | 5 – 6 | " |
| 2 moles 1-amino-3-acetyl-amino-benzene-6-sulphonic acid (hydrolysed) | 1 mole bis-pyrazol-one from 4,4'-bis-hydrazino-dibenzyl-2,2'-disulphonic acid and acetoacetic ethyl ester | 5 – 6 | " |
| 1 mole 1-amino-3-acetyl-amino-benzene-6-sulphonic acid (hydrolysed) | 1-(4'-sulphophenyl)-3-carboxy-pyrazolone-(5) | 5 – 6 | " |
| 1-amino-5-acetyl-amino-naphthalene-3,7-disulphonic acid (hydrolysed) | 1-(4'-sulphophenyl)-3-carboxy-pyrazolone-(5) | 5 – 6 | reddish yellow |
| 1-amino-2-methyl-benzene-4,6-disulphonic acid | 2-acetylamino-5-naphthol-7-sulphonic acid (hydrolysed) | 7 – 8 | orange |
| " | 2-acetylamino-8-naphthol-6-sulphonic acid (hydrolysed) | 7 – 8 | red |
| 1-amino-2-methyl-benzene-4,6-disulphonic acid | 1-chloro-2-acetyl-amino-5-naphthol-7-sulphonic acid (hydrolysed) | 7 – 8 | orange |
| 1-aminobenzene-2-sulphonic acid | 1-acetylamino-5-hydroxy-naphthal-ene-4,6-disulphonic-acid (hydrolysed) | 7–8 | red |
| 2-aminonaphthalene-3,6-disulphonic acid | " | 7 – 8 | bluish red |
| 2-aminonaphthalene-3,7-disulphonic acid | " | 7 – 8 | " |
| 2-aminonaphthalene-4,8-disulphonic acid | 1-acetylamino-8-hydroxy-naphthal-ene-4,6-disulphonic | 7 – 8 | bluish red |

-continued

| Diazo component | Azo component | pH of coupling medium | Shade on cellulose |
|---|---|---|---|
| | acid (hydrolysed) | | |
| 2-aminonaphthalene-3,6-disulphonic acid | 1-acetylamino-8-hydroxynaphthalene-3,6-disulphonic acid (hydrolysed) | 7 – 8 | " |
| 2-aminonaphthalene-4,8-disulphonic acid | " | 7 – 8 | " |
| 1-amino-4-methoxy-benzene-2-sulphonic acid | 2-(N-acetyl-N-methylamino)-5-hydroxynaphthalene-7-sulphonic acid (hydrolysed) | 7 – 8 | yellowish red |
| " | 2-(N-acetyl-N-methyl-amino)-8-hydroxynaphthalene-6-sulphonic acid (hydrolysed) | 7 – 8 | red |
| 1-aminobenzene-2-sulphonic acid | " | 7 – 8 | red |
| 1-aminobenzene-3-sulphonic acid | " | 7 – 8 | " |
| 1-aminobenzene-4-sulphonic acid | " | 7 – 8 | " |
| 1-amino-4-methyl-benzene-2-sulphonic acid | " | 7 – 8 | " |
| 1-amino-2,4-dimethyl-benzene-6-sulphonic acid | 2-(N-acetyl-N-methylamino)-8-hydroxynaphthalene-6-sulphonic acid (hydrolysed) | 7 – 8 | " |
| " | 2-acetylamino-8-hydroxynaphthalene-6-sulphonic acid (hydrolysed) | 7 – 8 | " |
| " | 2-acetylamino-8-hydroxynaphthalene-3,6-disulphonic acid (hydrolysed) | 7 – 8 | " |
| 4-aminoazobenzene-3,4'-disulphonic acid | 1-amino-3-acetyl-aminobenzene | 5 – 6 | yellow-brown |
| " | 1-amino-3-hydroxy-acetylaminobenzene | 5 – 6 | " |
| " | 1-amino-naphthalene-6-sulphonic acid | 5 – 6 | " |
| " | 1-amino-naphthalene-7-sulphonic acid | 5 – 6 | " |
| " | 1-amino-2-(4'-amino-2'-sulphophenyl-(1')-azo)-8-hydroxynaphthalene-3,6-disulphonic acid | 8 | black |

EXAMPLE 22

52.4 Parts of the disodium salt of 4-([4''-aminophenyl]amino)-2'-nitro-diphenylamine-3,4'-disulphonic acid are dissolved in 1000 parts of water and stirred with 20 parts 2,4-difluoro-6-methoxy-triazine at 0° to 10° C. for one hour. The liberated acid is continuously neutralised to a pH value of 6 to 7 by means of sodium carbonate. The resultant reactive nitro dyestuff of the formula

is salted out, filtered off, washed and dried. It dyes cellulose fibres from a long bath or by one of the usual padding methods in the presence of sodium carbonate as acid-binding agent in deep violet-brown shades fast to wet processing and rubbing.

EXAMPLE 23

0.1 Mole of the aminoazo dyestuff of the formula

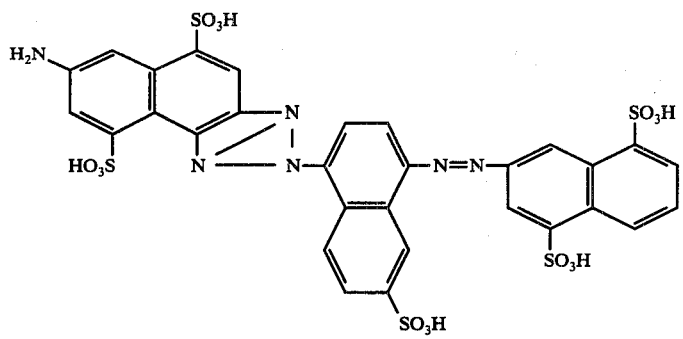

— prepared according to the instructions of German Patent No. 1,115,865 by coupling the diazonium compound from 2-aminonaphthalene-4,8-disulphonic acid with 1-aminonaphthalene-6-sulphonic acid, further diazotising the resultant aminoazo dyestuff, coupling with the equivalent amount of 2,5-diaminonaphthalene-4,8-disulphonic acid and conversion into the aminotriazole — is dissolved in 1000 parts by volume of water of pH 6 and mixed with 22 parts 2,4-difluoro-6-methylmercapto-triazine at a temperature of 20° to 30° C. while stirring. The hydrofluoric acid which is slowly liberated is neutralised with a sodium carbonate solution until the reaction is completed. The dyestuff is subsequently precipitated by the addition of sodium chloride, isolated, and dried at about 50° C. in a vacuum. It is a yellow powder which dissolves in water with a yellow colour.

EXAMPLE 24

When proceeding according to the instructions of Example 4, but coupling the resultant dyestuff intermediate, instead of with the diazo compound from 17.5 parts 2-amino-benzenesulphonic acid, with the diazo compound from 20.8 parts 3-chloroaniline-6-sulphonic acid in the presence of 12 parts sodium carbonate at a final pH of 7, then there is obtained a reactive dyestuff of the formula

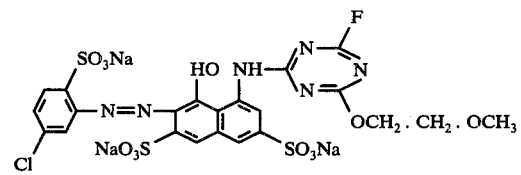

with which cellulose materials can be dyed or printed from a long bath at 40° C. or by one of the padding or printing methods customary for reactive dyestuffs with sodium carbonate as acid-binding agents in brilliant red shades fast to wet processing.

In an analogous manner there are obtained from the coupling components stated in the following Table, by acylation of their amino group with 2,4-difluoro-6-methoxy-triazine and coupling of the resultant dyestuff intermediates with the stated diazo components, valuable reactive dyestuffs with which cellulose materials can be dyed or printed, preferably in the presence of sodium carbonate, in the stated shades:

| Diazo component | Coupling component | pH of coupling medium | Shade on cellulose |
|---|---|---|---|
| 1-amino-4-methoxy-benzene-5-sulphonic acid | 1-amino-8-hydroxy-naphthalene-3,6-disulphonic acid | 7 – 8 | violet |
| " | 1-amino-8-hydroxy-naphthalene-4,6-disulphonic acid | 7 – 8 | reddish violet |
| " | 2-amino-5-hydroxy-naphthalene-1,7-disulphonic acid | 7 | scarlet |
| 1-amino-5-chloro-benzene-2-sulphonic acid | " | 7 | orange |
| 1-aminobenzene-3-sulphonic acid | " | 7 | " |
| 1-aminobenzene-4-sulphonic acid | " | 7 | " |
| " | 2-amino-8-hydroxy-naphthalene-3,6-disulphonic acid | 7 – 8 | scarlet |
| 4-aminobenzoic acid-(β-sulpho-ethyl)-amide | 1-amino-8-hydroxy-naphthalene-3,6-disulphonic acid | 7 – 8 | red |
| 1-amino-4-sulpho-acetylamino-benzene-6-sulphonic acid | " | 7 – 8 | violet |
| 1-amino-3-sulpho-acetylamino-benzene-6-sulphonic acid | 2-amino-5-hydroxy-naphthalene-1,7 disulphonic acid | 7 | orange |
| 1-amino-4-sulpho-acetylamino-benzene | 2-amino-5-hydroxy-naphthalene-1,7-disulphonic acid | 7 | scarlet |
| 1-aminobenzene-2,4-disulphonic | 1-(2'-methyl-3'-amino-5'-sulpho- | 6 | yellow |

-continued

| Diazo component | Coupling component | pH of coupling medium | Shade on cellulose |
|---|---|---|---|
| acid | phenyl)-3-methyl-pyrazolone-(5) | | |
| 2-amino-naphthalene-4,8-disulphonic acid | " | 6 | " |

EXAMPLE 25

0.1 Mole 4-ureido-2-amino-1-hydroxybenzene-5-sulphonic acid is diazotised and coupled soda-alkaline with 0.1 mole 1-amino-8-hydroxynaphthalene-2,4-disulphonic acid. The coupling solution is adjusted to a content of 2 moles/litre with caustic soda and then boiled under reflux for 3 hours to hydrolyse the ureido group. After cooling, the mixture is neutralised with hydrochloric acid. The dyestuff is metallised by the addition of 25 parts copper sulphate and 100 parts of a 2N sodium hydroxide solution at 45° C. and a pH value of 4 to 6 and, after 30 minutes, acylated at pH 6 to 7 and temperatures of 20° to 30° C. with 0.1 mole 2,4-difluoro-6-methoxy-triazine. The resultant dyestuff of the formula

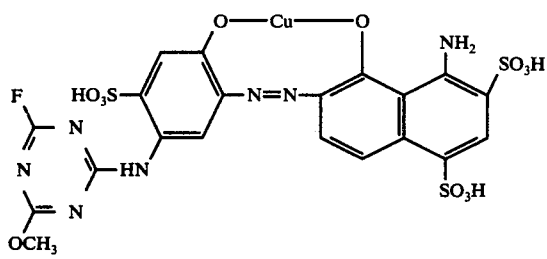

is salted out. A blue dyeing is obtained on cotton.

EXAMPLE 26

When the procedure described in Example 21 is followed but, instead of the aminoazo dyestuff there used, 53.1 parts of the disodium salt of the amino azo dyestuff obtained by coupling diazotised 1-amino-4-nitrobenzene-2-sulphonic acid with 1-(2'-chloro-5'-sulphophenyl)-3-methyl-pyrazolone-(5) and subsequent reduction of the nitro group with sodium sulphide, are acylated with 2,4-difluoro-6-phenylamino-triazine, then a valuable reactive dyestuff is also obtained, with which cellulose materials can be printed in fast yellow shades by the usual dyeing or printed methods.

Similar reactive dyestuffs are obtained, when, instead of the aminoazo dyestuff mentioned above, one of the aminoazo dyestuffs synthetised from the components stated in the following Table is acylated with 2,4-difluoro-6-methoxy-triazine.

| Diazo component | Azo component | Shade |
|---|---|---|
| 1-amino-4-nitrobenzene-2-sulphonic acid (reduced) | 1-(2'-methyl-4'-sulphophenyl)-3-methyl-pyrazolone-(5) | yellow |
| " | 1-(2',5'-disulphophenyl)-3-methyl-pyrazolone-(5) | " |
| " | 1-(2'-methyl-4'-sulpho-6'-chlorophenyl)-3-methyl-pyrazolone-(5) | " |
| " | 1-(2',5'-dichloro-4'-sulphophenyl)-3-methyl-pyrazolone-(5) | " |
| 1-amino-3-acetyl-aminobenzene-6-sulphonic acid (hydrolysed) | 1-(2'-methyl-4'-sulphophenyl)-3-methyl-pyrazolone-(5) | greenish yellow |
| " | 1-(4'-sulphophenyl)-3-methyl-pyrazolone-(5) | " |
| " | 1-(2'-methyl-4'-sulphophenyl)-3-carboxy-pyrazolone-(5) | " |
| " | 1-(2'-chloro-4'-sulphophenyl)-3-carboxypyrazolone-(5) | " |

EXAMPLE 27

58 Parts of the dyestuff of the formula

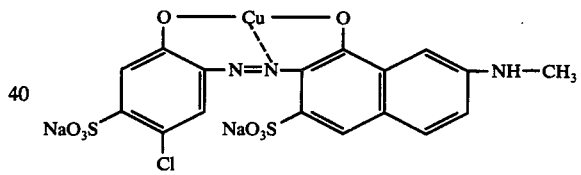

(prepared by coupling diazotised 1-hydroxy-2-amino-4-chlorobenzene-5-sulphonic acid with 2-methylamino-8-hydroxynaphthalene-6-sulphonic acid and coppering the resultant azo dyestuff) are dissolved neutral in 700 parts of water. 20 Parts 2,4-difluoro-6-ethoxy-triazine are added dropwise and the mixture is stirred at 0° to 10° C., while continuously neutralising the liberated hydrochloric acid to pH 6 to 7 by means of a sodium carbonate solution, until free amino groups can no longer be detected. The resultant reactive dyestuff of the formula

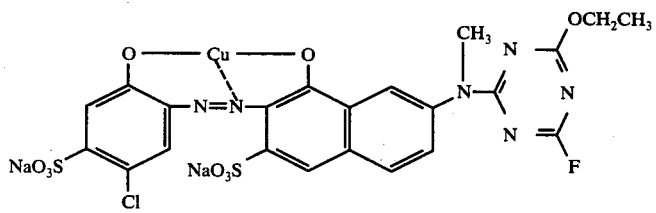

is salted out, filtered off, washed and dried at 30° to 40° C. The dyestuff dyes cellulose materials by one of the methods described above in very fast violet shades.

Dyestuffs with similar properties are obtained in analogy with the method described above from the copper complexes — obtained by simple demethylating or oxidising coppering — of the mono- and disazo dyestuffs prepared from the diazo and azo components stated in the following Table:

| Diazo component | Azo component | pH of coupling medium | Shade |
|---|---|---|---|
| 1-hydroxy-2-amino-4-chloro benzene-5-sulphonic acid | 2-amino-8-hydroxy-naphthalene-3,6-disulphonic acid | 10 | reddish violet |
| " | 1-amino-8-hydroxy-naphthalene-3,6-disulphonic acid | 10 | bluish violet |
| 2-amino-naphthalene-4,6,8-trisulphonic acid (coppered with oxidation) | 2-hydroxy-6-acetylamino-naphthalene-4-sulphonic acid (hydrolysed) | 8 – 9 | reddish blue |
| 1-amino-2-hydroxy-6-nitronaphthalene-4-sulphonic acid (reduced) | 1-hydroxy-8-ethoxy-naphthalene-3,6-disulphonic acid | 10 | blue |
| 1-hydroxy-2-amino-benzene-4,6-disulphonic acid | 2-hydroxy-3-amino-naphthalene-5,7-disulphonic acid | 10 | red |
| 2-amino-naphthalene-4,8-disulphonic acid (coppered with oxidation) | " | 8 – 9 | blue |
| 2-aminonaphthalene-4,6,8-trisulphonic acid (coppered with oxidation) | 2-hydroxy-3-amino-naphthalene-7-sulphonic acid | 8 – 9 | blue |
| 3-methoxy-4-amino-6-methyl-azobenzene-2',4'-disulphonic acid (coppered with demethylation) | 2-methylamino-5-hydroxynaphthalene-7-sulphonic acid | 10 | navy blue |
| " | 2-amino-8-hydroxy-naphthalene-3,6-disulphonic acid | 10 | " |
| " | 2-amino-5-hydroxy-naphthalene-1,7-disulphonic acid | 10 | " |
| 3-methoxy-4-amino-6-methyl-azobenzene-2',5'-disulphonic acid (coppered with demethylation) | 2-methylamino-5-hydroxynaphthalene-7-sulphonic acid | 10 | navy blue |
| " | 2-amino-8-hydroxy-naphthalene-3,6-disulphonic acid | 10 | " |
| " | 2-amino-5-hydroxy-naphthalene-1,7-disulphonic acid | 10 | " |

EXAMPLE 28

62 Parts of the trisodium salt of the dyestuff obtained by soda-alkaline coupling of diazotised 4-chloro-2-amino-1-hydroxybenzene-6-sulphonic acid with 1-amino-8-hydroxynaphthalene-3,6-disulphonic acid are mixed in 300 parts of water at 70° to 80° C. and a pH of 8 to 9 with 54.2 parts of the 1:1 chromium complex of the dyestuff obtained from 6-nitro-1-diazo-2-hydroxynaphthalene-4-sulphonic acid and 2-hydroxynaphthalene. A deep blue solution has formed after 10 minutes.

The mixed complex is acylated within about 2 hours at 20° to 30° C. and a pH of 6 to 7 with 20 parts 2,4-difluoro-6-methoxy-triazine. During this operation the pH value is kept constant by the dropwise addition of a sodium carbonate solution. The acylated dyestuff is separated by means of 20% sodium chloride, filtered off with suction and dried at 30° C.

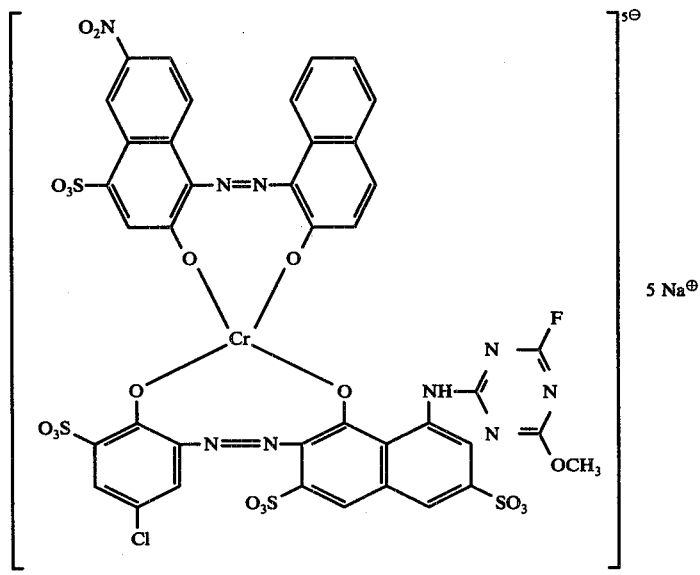

A blue-black print of excellent fastness to light and washing is obtained on cotton by the method described in Example 3.

EXAMPLE 29

30.4 Parts 2-amino-8-hydroxynaphthalene-3,6-disulphonic acid are dissolved neutral in 300 parts of water, the solution is heated to 20° to 30° C. and 20 parts 2,4-difluoro-6-methoxytriazine are added. 40 Parts of a 15% sodium carbonate solution are added in the course of one hour so that the pH is 6 to 7.

A diazonium salt solution freshly prepared from 13.6 parts p-aminobenzyl-sulphonic acid is added dropwise at 0°–5° C. to the suspension of the acylation product which has been mixed with 12.5 parts sodium carbonate. After further stirring at ice bath temperature for 5 hours, the product is salted out with sodium chloride, filtered off with suction, washed with a dilute sodium chloride solution and dried at 30° C. in a vacuum drying cabinet. The dyestuff obtained corresponds to the formula

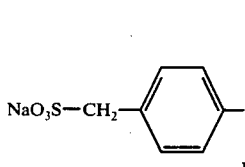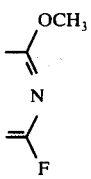

By proceeding as described above, but acylating, instead of 30.4 parts 2-amino-8-hydroxynaphthalene-3,6-disulphonic acid, 30.4 parts 2-amino-5-hydroxynaphthalene-1,7-disulphonic acid with 2,4-difluoro-6-methoxy-triazine and coupling the reactive group-containing coupling component with diazotised p-aminobenzylsulphonic acid, a reactive dyestuff is obtained which is readily soluble and dyes fabrics containing cellulose fibres in brilliant reddish orange shades.

A cotton or staple fibre fabric is impregnated on a foulard at 20° to 25° C. with a solution containing, per liter of liquor, 30 g of the dyestuff described in Paragraph 1 of the present Example, 100 g urea and 20 g sodium carbonate, the fabric is squeezed to a moisture content of about 100% and the moist fabric is rolled up again. After standing at room temperature for 2 hours, the fabric is rinsed, soaped at the boil in the usual manner and dried. A brilliant scarlet dyeing of good fastness to wet processing and light is obtained.

A cotton or staple fibre fabric is impregnated on a foulard at 20° to 25° C. with a solution containing, per liter of liquor, 30 g of the dyestuff described in Paragraph 1 of the present Example, 100 g urea and 20 g of sodium carbonate, the fabric is squeezed to a moisture content of about 100% and steamed at 103° C. for 15 seconds. After rinsing, soaping at the boil and drying, a brilliant scarlet dyeing of good fastness to wet processing and light is likewise obtained.

A cotton fabric is impregnated with a solution at 20 to 25° C. containing, per liter of liquor, 20 g of the dyestuff obtainable according to Paragraph 1 of the present Example and 0.5 g of a non-ionic wetting agent (e.g. a polyethoxylated oleyl alcohol) as well as 150 g urea and 15 g sodium bicarbonate. The fabric is subsequently squeezed between two rubber rollers to a moisture content of about 100%. After an intermediate drying at 50° to 60° C., the fabric is heated at 140° C. for 30 seconds and the dyeing so obtained is thoroughly rinsed with hot water and treated at the boil for 10 minutes with a solution containing, per liter 5 g of Marseilles soap and 2 g sodium carbonate. After rinsing and drying, there is obtained an intense scarlet dyeing of good fastness to wet processing and light.

When a cellulose fabric is printed with a printing paste which contains, per kilogram, 30 g of the dyestuff described in Paragraph 1 of the present Example, 100 g urea, 300 g of water, 500 g of an alginate thickening agent (60 g sodium alginate per kilogram of thickening agent), 10 g sodium carbonate and 10 g of the sodium salt of 3-nitrobenzene-sulphonic acid, and which was made up to 1 kilogram with water, the fabric is subsequently subjected to an intermediate drying and then steamed in a suitable steaming apparatus at 103° to 115° C. for 30 seconds, an intense scarlet dyeing of good fastness properties is obtained after rinsing and soaping at the boil.

100 Parts of wool are introduced at 40° C. into a bath containing, in 5000 parts of water, 1.5 parts of the dyestuff described in Paragraph 1 of the present Example, as well as 6 parts of 30% acetic acid and 0.5 parts of a polyethoxylated stearylamine derivative containing hydroxyl groups. The dyebath is brought to the boil within 30 minutes and dyeing is then performed at the boil for one hour. After rinsing and drying, there is obtained a brilliant scarlet dyeing of good fastness to washing, milling and light.

EXAMPLE 30

28.9 Parts 2-amino-1-methylbenzene-3,5-disulphonic acid (monosidium salt) are diazotised and the diazo compound is coupled with 13.7 g 1-amino-2-methoxy-5-methylbenzene in a weakly acidic medium. The resultant monoazo dyestuff is isolated and subsequently diazotised, or also immediately diazotised in solution without isolation, and coupled alkaline with 25.3 parts 2-methylamino-5-hydroxynaphthalene-7-sulphonic acid. The disazo dyestuff obtained is salted out by the addition of sodium chloride, filtered off with suction, and the isolated product is metallised with about 50 parts of crystalline copper sulphate, 40 parts diethanolamine, 50 parts ammonia (d 0.88) at 95° to 100° C. within 5 hours. The dyestuff is isolated from the coppering solution by the addition of salt and careful acidification.

The coppered amino-disazo dyestuff is then acylated in an aqueous solution at pH 6 to 7 and a temperature of 20° to 30° C. with 20 parts 2,4-difluoro-6-methoxy-triazine, the pH value being kept within the stated range by the addition of sodium carbonate. When the acylation is completed, the dyestuff is isolated with sodium chloride and dried at 35° C. In the form of the free sulphonic acid the dyestuff corresponds to the formula

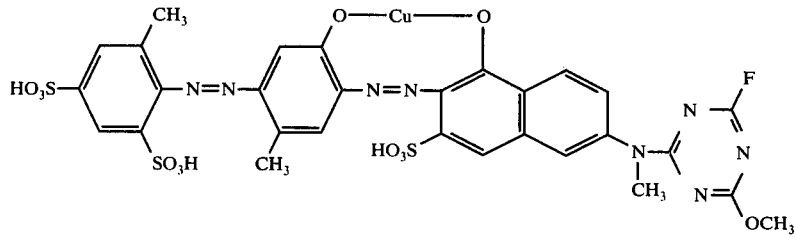

it dyes cellulose fabrics by the methods known for reactive dyestuffs in navy-blue shades fast to wet processing and light.

Other dyestuffs according to the invention can be prepared in a similar manner by combining the above monoazo dyestuff obtained from 2-amino-1-methylbenzene-3,5-disulphonic acid and 1-amino-2-methoxy-5-methylbenzene according to the instructions given above with the aminonaphthol-sulphonic acids stated in the following Table and with 2,4-difluoro-6-methylmercapto-triazine.

Coupling component
   2-amino-5-hydroxynaphthalene-1,7-disulphonic acid
   2-amino-8-hydroxynaphthalene-3,6-disulphonic acid When a fabric of cotton or regenerated cellulose is dyed or printed with this dyestuff according to one of the processes described above, clear bluish red dyeings and prints of a good fastness to wet processing, rubbing and light are obtained.

In the following Table there are listed the shades of further dyestuffs which are synthesised from the likewise specific diazo components, coupling components and reactive components linkable to an amino group which in the latter, in analogy with the instructions given in Example 31 or also by reacting the corresponding aminoazo dyestuffs with reactive components, and which can be dyed or printed on to cellulose materials by one of the methods described above.

| Diazo component | Coupling component | Reactive component | Shade |
|---|---|---|---|
| 1-aminobenzene-2-sulphonic acid | 1-amino-8-hydroxy-naphthalene-3.6-disulphonic acid | 2.4-difluoro-6-(N-methyl)-phenylamino-triazine | red |
| " | 1-(4'-aminobenzoyl-amino)-8-hydroxy-naphthalene-3.6-disulphonic acid | " | " |
| " | " | 2.4-difluoro-6-n-butylamino-triazine | " |
| 2-amino-naphthalene-1.5-disulphonic acid | 2-amino-naphtha-amino)-8-hydroxy-naphthalene-3.6-disulphonic acid | 1-(4'-aminobenzoyl-phenyl-amino-triazine | 2.4-difluoro-6 red |
| 1-amino-benzene-2-sulphonic acid | 1-amino-8-hydroxy-naphthalene-3,6-disulphonic acid | 2.4-difluoro-6-benzyl-amino-triazine | " |
| 1-amino-2-carboxy-benzene-4-sulphonic acid | 1-amino-8-hydroxy-naphthalene-3.6-disulphonic acid | 2.4-difluoro-6-phenyl-amino-triazine | |
| 1-amino-4-methyl-benzene-2-sulphonic acid | " | " | " |
| 1-amino-3-acetyl-amino-benzene-6-sulphonic acid | " | " | " |
| 1-amino-benzene-2-sulphonic acid | 2-amino-5-hydroxy-naphthalene-7-sulphonic acid | " | orange |

The dyestuffs so obtained have a blue colour.

EXAMPLE 31

To a solution of 36.5 parts of the sodium salt of 1-amino-8-hydroxynaphthalene-3.6-disulphonic acid in 200 parts of water there are added, at 20° C., 23 parts 2.4-difluoro-6-phenylaminotriazine, and a pH of 8 - 8.5 is maintained by continuous neutralisation of the liberated acid. The reaction is observed chromatographically. The resultant solution of the dyestuff intermediate is poured into 900 parts of water and coupled at pH 7-8 and a temperature of 0°-5° C. with 17.5 parts diazotised 2-aminobenzene-sulphonic acid dissolved in 200 parts of water. At a final pH of 6.5 the product is salted out with sodium chloride, filtered of with suction and washed with a 15% sodium chloride solution. Drying is carried out at 30°-40° C. in vacuum. The dyestuff of the formula

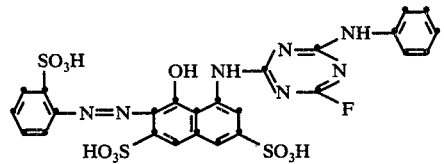

forms red small needles.

EXAMPLE 32

To a solution of 21 parts of the sodium salt of 1.3-diamino-benzene-4-sulphonic acid in 200 parts of water there are added with good stirring 24 parts 2.4-difluoro-6-phenylaminotriazine, and the mixture is stirred at 0°-5° C. while continuously neutralising the liberated hydrofluoric acid to pH 7-8 until a sample which is diazotised and coupled with 1-hydroxy-naphthalene-4-sulphonic acid yields a clear, yellowish red dyeing. The resultant dyestuff intermediate is filtered off with suction, washed with a 10% sodium chloride solution and dried at 60° C.

39.8 parts of the sodium salt of 1-amino-3-(2'-fluoro-4'-phenylamino-triazinyl-6')-amino-benzene-6-sulphonic acid obtained as described above are dissolved in 350 parts of water and 700 parts dimethylformamide and, after the addition of 6.9 parts of sodium nitrite, slowly added dropwise to a solution, which is cooled to 0° C., of 60 parts of concentrated hydrochloric acid in 100 parts of water. After half an hour any excess quantity of nitrite is destroyed with amidosulphonic acid and the resultant diazo suspension is added to a solution of 29.8 parts 1-(4'-sulfo-2'-methyl-phenyl)-pyrazolone-6-carboxylic-acid-(3) in 350 parts of water. The pH value of the solution is adjusted to 5-5.5. After the coupling is complete, the dyestuff of the formula

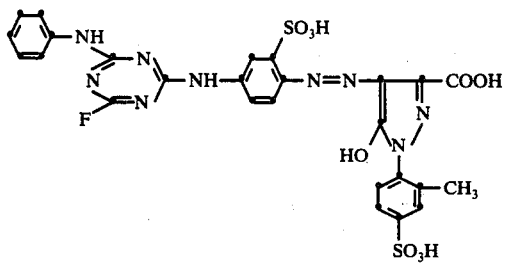

is salted out with sodium chloride, filtered off with suction, washed with a saturated sodium chloride solution and dried at 60° C. in a vacuum. The dyestuff readily dissolves in water with a yellow colour and yields yellow dyeings and prints on cellulose materials by one of the methods described above.

The following Table lists starting components and the shades and the pH value of the coupling medium of dyestuffs which are prepared in analogy with the instructions of Example 32 from a diazo component containing an acylatable amino group, from a coupling component and from a reactive component linkable to the acylatable amino groups of the diazo component. The methods described above can be used for dyeing and printing cellulose materials.
Reaction components:

A : 2.4-difluoro-6-phenylamino-triazine
B : 2.4-difluoro-6-n-butylamino-triazine
C : 2.4-difluoro-6-(o-methyl-phenyl)-amino-triazine
D : 2.4-difluoro-6-benzylamino-triazine

| Diazo component | Coupling component | Reactive component | pH of coupling medium | Shade |
|---|---|---|---|---|
| 1.3-diaminobenzene-4-sulphonic acid | 2-amino-naphthalene-3.6-disulphonic acid | C | 4 – 5 | orange |
| " | 1-acetylamino-3-hydroxy-naphthalene-3.6-disulphonic acid | D | 7 – 8 | red |
| " | 1-(2'.5'-dichloro-4'-sulphophenyl)-3-methyl-pyrazolone-5 | A | 5 – 6 | yellow |
| " | 1-(3'-sulphophenyl)-3-methyl-5-amino-pyrazole | A | 6 | " |
| 1.4-diaminobenzene-3-sulphonic acid | 2-amino-8-hydroxy-naphthalene-6-sulphonic acid | A | 4 – 4.5 | red |
| " | 2-acetylamino-5-hydroxy-naphthalene-7-sulphonic acid | B | 6 – 7 | scarlet |

EXAMPLE 33

79.6 parts 1-amino-8-hydroxy-naphthalene-3,6-disulphonic acid are dissolved in 500 parts of water and a suspension of the diazo salt of 1-amino-3-(2'-fluoro-4'-phenylamino-triazinyl-6')-aminobenzene-6-sulphonic acid (prepared from 47 parts 1.3-diaminobenzene-sulphonic acid according to Example 32 is added to the solution. A pH value of 3 is adjusted with a sodium acetate solution. After the coupling is complete, the crystalline reaction product is salted out with sodium chloride, filtered off with suction and washed with a 10% sodium chloride solution. The dyestuff is dried at 60° C. in vacuum.

EXAMPLE 34

38.6 parts of the monoazo dyestuff of Example 33 are dissolved in 460 parts of water and 6.7 parts sodium carbonate, and a diazonium solution of 4.7 parts aniline are added at 0°–5° C. while maintaining a pH of 8–8.5. Stirring is continued for about 3 hours, a pH value of 5.5 is adjusted with hydrochloric acid, the reaction product is filtered off with suction and washed with a 5% sodium chloride solution. The dyestuff of the formula

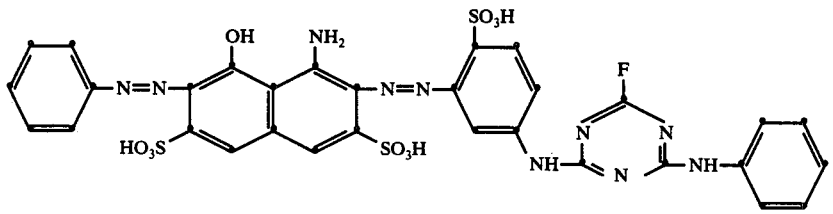

which is dried at 60° C. in a vacuum, yields black shades on cotton and staple rayon.

When using in this Example, instead of aniline, the diazo components listed in the following Table in equivalent quantities, there are likewise obtained valuable dyestuffs.

| Diazo component | Shade |
|---|---|
| 2-amino-benzene-1-sulphonic acid | black |
| 2-amino-5-chloro-benzene-1-sulphonic acid | " |
| 2-amino-5-methyl-benzene-1-sulphonic acid | " |
| 2-amino-5-nitro-benzene-1-sulphonic acid | " |
| 2-amino-naphthalene-1-sulphonic acid | " |
| dihydro-p-toluidin-disulphonic acid | " |
| 2-amino-naphthalene-1.5-disulphonic acid | " |

We claim:
1. A reactive dyestuff of the formula

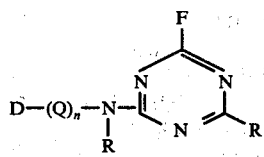

wherein
D stands for the radical of a water-soluble sulfonic acid containing azo dyestuff;
R stands for hydrogen or lower alkyl;
Q stands for CO, SO$_2$, CH$_2$, CH$_2$CO,

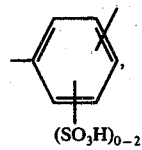

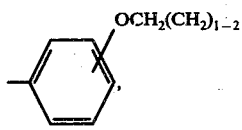

and

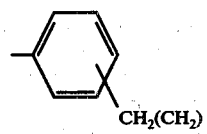

$n$ stands for 0 or 1, —(Q)$_n$—N(R) being linked with a nuclear aromatic carbon atom of D; R$_1$ stands for NH$_2$, hydroxy; mercapto; methyl; trichloromethyl; phenyl; methylphenyl; chlorophenyl; sulfophenyl; hydroxyphenyl; morpholino; piperidino; hydrazino; N-methylhydrazino; N—(R$_{10}$)—R'; wherein R$_{10}$ stands for lower alkyl, cyano lower alkyl, hydroxy lower alkyl, phenyl or phenyl substituted by a member selected from the class consisting of chlorine, bromine, lower alkyl, lower alkoxy, sulfo, and carboxy; and R' stands for hydrogen, lower alkyl, hydroxy lower alkyl, cyano lower alkyl or benzyl; OR$_{11}$ wherein R$_{11}$ stands for phenyl, sulfophenyl, lower alkyl or lower alkoxy substituted lower alkyl; or SR$_{12}$ wherein R$_{12}$ stands for lower alkyl, hydroxy lower alkyl, phenyl, chlorophenyl, sulfophenyl; and F is fluoro.

2. A water-soluble reactive dyestuff of claim 1 of the formula

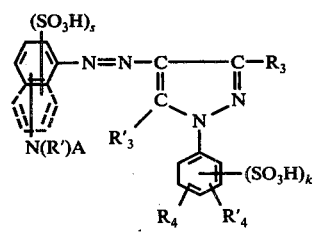

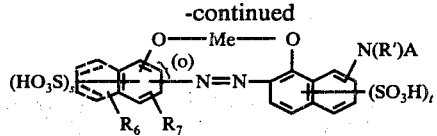

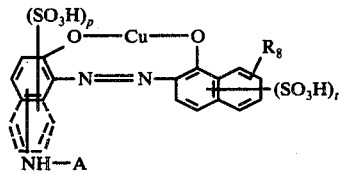

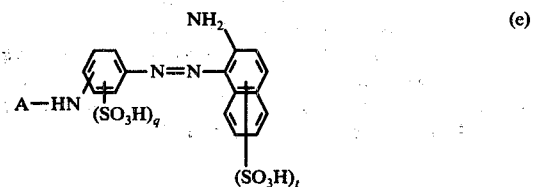

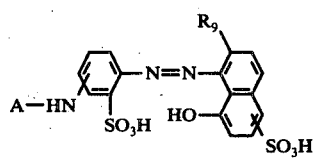

or

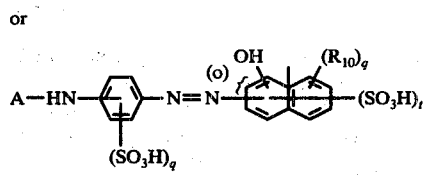

wherein A stands for the radical

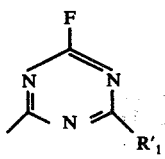

wherein R'$_1$ is NH$_2$; lower alkyl amino; cyanoloweralkylamino, hydroxy lower alkyl amino; benzylamino; phenylamino; sulfophenylamino; chlorophenylamino; gromophenylamino; lower alkyl phenylamino; lower alkoxy phenylamino; carboxy phenylamino; N,N di lower alkylamino; N-lower alkyl-N-cyano lower alkylamino; N-lower alkyl-N-hydroxy lower alkylamino; N-lower alkyl-N-benzylamino; N-lower alkyl-N-phenylamino; N-lower alkyl-N-sulfophenylamino; N-lower alkyl-N-chlorophenylamino; N-lower alkyl N-bromophenyl amino; N-lower alkyl-N-lower alkoxy phenylamino; N lower alkyl-N-carboxy phenylamino; N,N-dihydroxy lower alkylamino; N-hydroxy lower alkyl-N-cyano lower alkylamino; N-hydroxy lower alkyl-N-benzylamino; N-hydroxy lower alkyl-N-phenyl amino; N-hydroxy lower alkyl-N-sulfophenylamino; N-hydroxy lower alkyl-N-chlorophenylamino; N-hydroxy lower alkyl-N-lower alkyl phenylamino; N-hydroxy lower alkyl N-lower alkoxy phenylamino; N-hydroxy lower alkyl-N-carboxy lower alkylamino; N,N-dicyano lower alkyl amino; N-cyano lower alkyl-N-benzylamino; N-cyano lower alkyl-N- phenylamino; N-cyano lower alkyl-N-sulfophenylamino; N-cyano lower alkyl-N-chlorophenylamino; N-cyano lower alkyl-N-bromophenylamino; N-cyano lower alkyl-N-lower alkoxy phenylamino; N-cyano lower alkyl-N-carboxyphenylamino; N,N-dibenzylamino; N-benzyl-N-phenylamino; N-benzyl-N-sulfophenylamino; N-benzyl-N-chlorophenylamino; N-benzyl-N-bromophenylamino; N-benzyl-N-lower alkoxy phenylamino; N-benzyl-N-carboxy phenylamino; lower alkoxy, or lower alkoxy substituted lower alkoxy;

F stands for fluro;

R' stands for hydrogen or methyl;

(o) indicates the substituents standing in adjacent position in the aryl nucleus;

Me stands for Cu, Cr or Co;

$R_3$ stands for —$CH_3$ or —COOH;

$R_3'$ stands for —OH or $NH_2$;

$R_4$ stands for hydrogen, chlorine or methyl;

$R_4'$ stands for hydrogen, chlorine or methyl;

$R_5$ stands for hydrogen, methoxy or acylamino wherein acyl stands for acetyl, hydroxy acetyl, sulfoacetyl, benzoyl, aminobenzoyl, methanesulfonylamino, or aminophenyl sulfonylamido;

$R_6$ stands for hydrogen, hydroxyl or nitro;

$R_7$ stands for hydrogen, chlorine or nitro;

$R_8$ stands for $NH_2$ or acylamino, wherein acyl is as defined above;

$R_9$ stands for $NH_2$ or alkyl amino having 1–4 carbon atoms in the alkyl group;

$R_{10}$ stands for acylamino, where acyl is as defined above;

$q$ stands for the number 0 or 1;

$p$ stands for the number 0, 1 or 2;

$s$ stands for an integer ranging from 0 to 3;

$t$ stands for an integer ranging from 1 to 3; and $k$ stands for the number 1 or 2, the dyestuff must contain at least one sulfo group.

3. A reactive dyestuff of claim 1 where R stands for hydrogen or methyl;

$R_1$ stands for amino; lower alkyl amino; cyanoloweralkylamino, hydroxy lower alkyl amino, benzylamino, phenylamine, sulfophenylamino, chlorophenylamino, bromophenylamino, loweralkyl phenylamino, lower alkoxy phenylamino, carboxy phenylamino, N,N di lower alkylamino, N-lower alkyl-N-cyano lower alkylamino, N-lower alkyl-N-hydroxy lower alkylamino, N-lower alkyl-N-benzylamino, N-lower alkyl-N-phenylamino, N-lower alkyl-N-sulfophenylamino, N-lower alkyl-N-chlorophenylamino, N-lower alkyl N-bromophenyl amino, N-lower alkyl-N-lower alkoxy phenylamino, N lower alkyl-N-carboxy phenyl amino, N,N-dihydroxy lower alkylamino, N-hydroxy lower alkyl-N-cyano lower alkylamino, N-hydroxy lower alkyl-N-benzylamino, N-hydroxy lower alkyl-N-phenyl amino, N-hydroxy lower alkyl-N-sulfophenylamino, N-hydroxy lower alkyl-N-chlorophenylamino, N-hydroxy lower alkyl-N-bromophenylamino, N-hydroxy lower alkyl-N-lower alkyl phenyl amino, N-hydroxy lower alkyl N-lower alkoxy phenylamino, N-hydroxy lower alkyl-N-carboxy lower alkylamino, N,N-dicyanolower alkyl amino, N-cyano lower alkyl-N-benzylamino, N-cyano lower alkyl-N-phenylamino, N-cyano lower alkyl-N-sulfophenyl amino, N-cyanolower alkyl-N-chlorophenylamino, N-cyano lower alkyl-N-bromophenylamino, N-cyano lower alkyl-N-lower alkyl phenylamino, N-cyano lower alkyl-N-lower alkoxy phenylamino, N-cyano lower alkyl-N-carboxyphenylamino, N,N-dibenzylamino, N-benzyl-N-phenylamino, N-benzyl-N-sulfophenylamino, N-benzyl-N-chlorophenylamino, N-benzyl-N-bromophenylamino, N-benzyl-N-lower alkoxy phenylamino, N-benzyl-N-carboxy phenylamino, lower alkoxy, or lower alkoxy substituted lower alkoxy; and F is fluoro.

4. Dyestuff of claim 1 wherein D is a monovalent metal-free or metal-containing mono or polyazo dyestuff radical.

5. The dyestuff of claim 1 of the formula

6. The dyestuff of claim 1 of the formula

7. The dyestuff of claim 1 of the formula

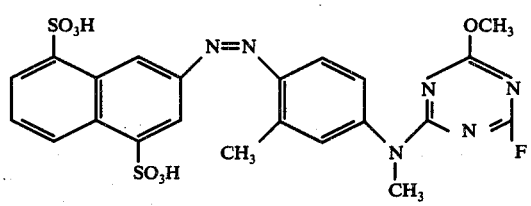
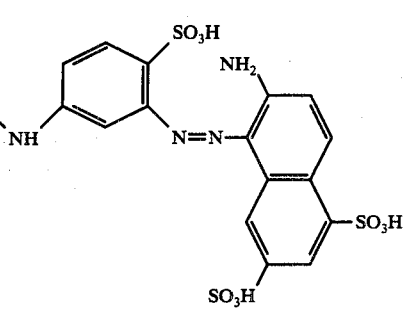
8. The dyestuff of claim 1 of the formula
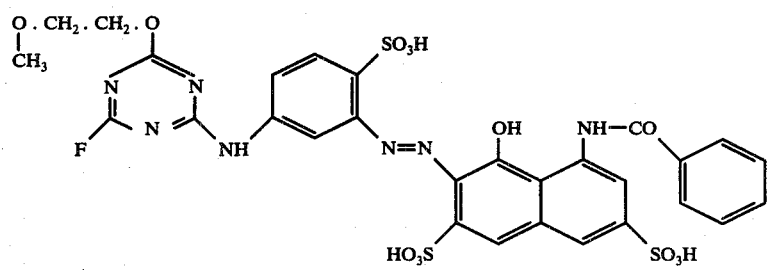
9. The dyestuff of claim 1 of the formula
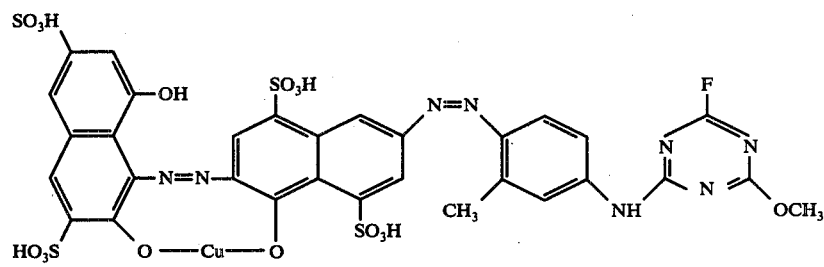
10. The dyestuff of claim 1 of the formula
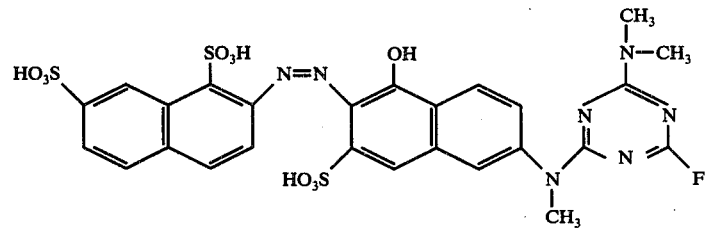
11. The dyestuff of claim 1 of the formula
12. The dyestuff of claim 1 of the formula
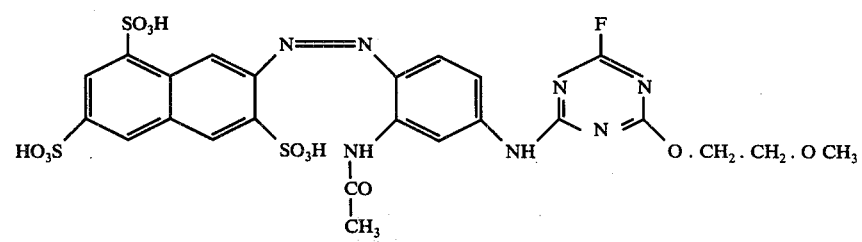
13. The dyestuff of claim 1 of the formula

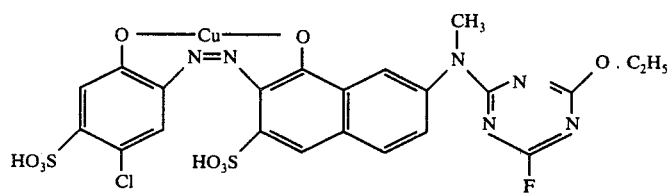
14. The dyestuff of claim 1 of the formula
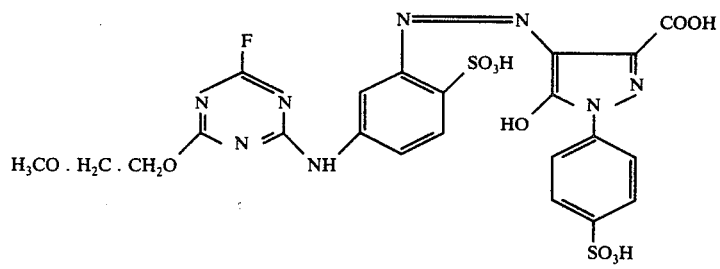
15. The dyestuff of claim 1 of the formula
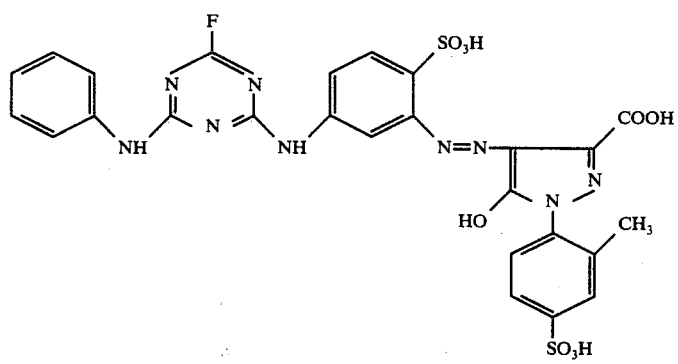
16. The dyestuff of claim 1 of the formula
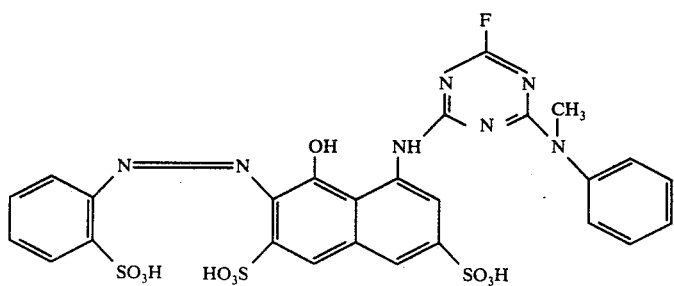
17. The dyestuff of claim 1 of the formula

18. The dyestuff of claim 1 of the formula
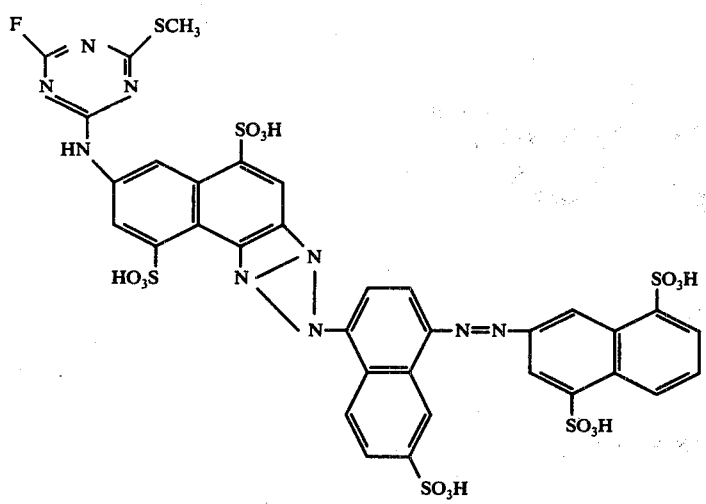
19. The dyestuff of claim 1 of the formula
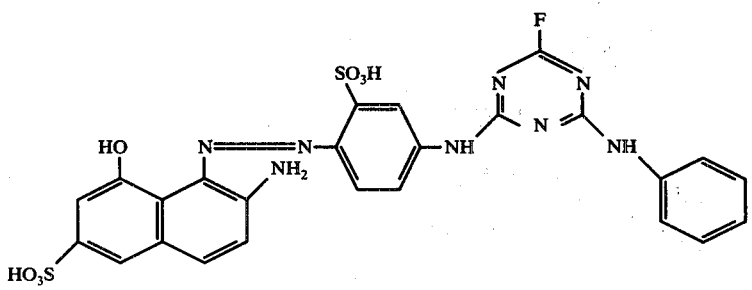
20. The dyestuff of claim 1 of the formula
21. The dyestuff of claim 1 of the formula
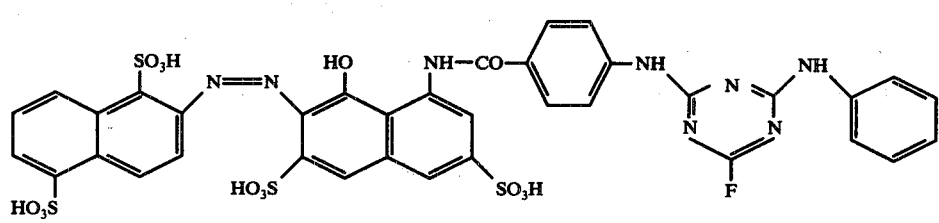
22. The dyestuff of claim 1 of the formula
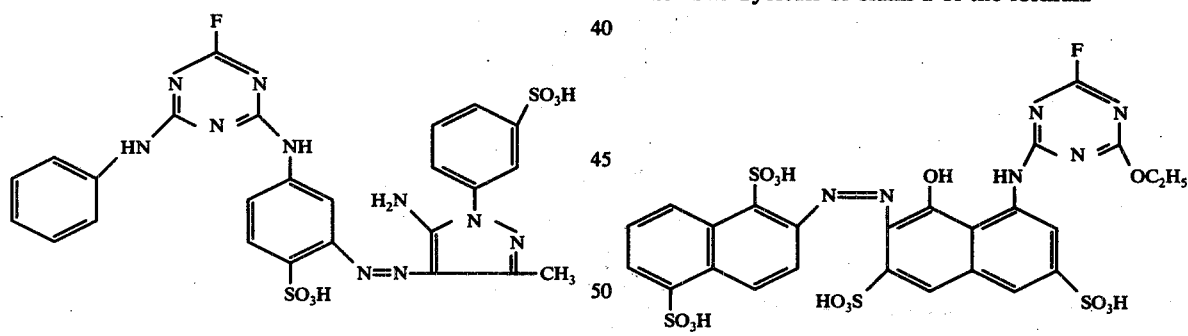

23. The dyestuff of claim 1 of the formula

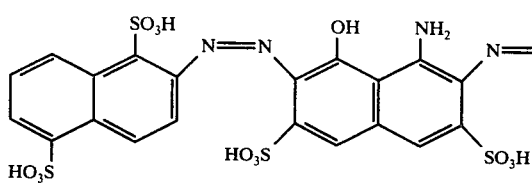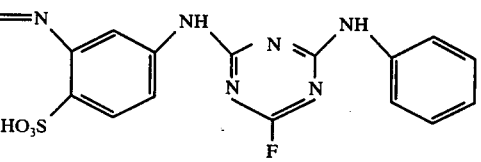

24. A water-soluble reactive dyestuff of the formula

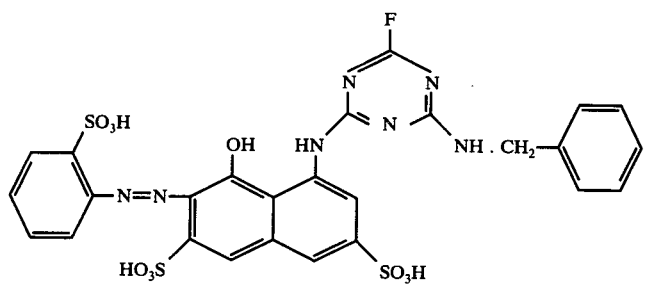

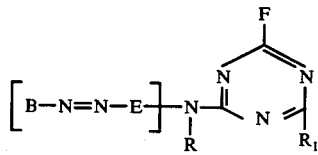

wherein B is the radical of a carbocyclic diazo component of the benzene or naphthalene series; and E is the radical of a coupling component of the hydroxy benzene, hydroxy naphthalene, aminonaphthalene, 5-pyrazolone, or acetoacetic acid arylamide series said radicals bound with a ring carbon atom to the azo bridge or if E is of the acetoacetic acid arylamide series said radical is bound with an acyclic carbon atom to the azo bridge; B—N=N—E contains sulfonic acid groups;

R stands for hydrogen, or lower alkyl;

$R_1$ stands for $NH_2$; hydroxy; mercapto; methyl; trichloromethyl; phenyl; methylphenyl; chlorophenyl; sulfophenyl; hydroxyphenyl; morpholino; piperidino; hydrazino, N-methylhydrazino; lower alkyl amino; cyanoloweralkylamino, hydroxy lower alkyl amino, benzylamino, phenylamino, sulfophenyl amino, chlorophenylamino, bromophenylamino, lower alkylphenylamino, lower alkoxy phenylamino, carboxy phenylamino, N,N-dilower alkylamino, N-lower alkyl-N-cyano lower alkylamino, N-lower alkyl-N-hydroxy lower alkylamino, N-lower alkyl-N-benzylamino, N-lower alkyl-N-phenylamino, N-loweralkyl-N-sulfophenylamino, N-lower alkyl-N-chlorophenylamino, N-lower alkyl-N-bromophenyl amino, N-lower alkyl-N-lower alkylphenylamino, N-lower alkyl-N-lower alkoxyphenylamino, N-lower alkyl-N-carboxyphenylamino, N,N-dihydroxy lower alkylamino, N-hydroxy lower alkyl-N-cyano lower alkylamino; N-hydroxy lower alkyl-N-benzylamino, N-hydroxy lower alkyl-N-phenylamino, N-hydroxy lower alkyl-N-sulfophenylamino, N-hyroxy lower alkyl-N-chlorophenylamino, N-hydroxy lower alkyl-N-bromophenylamino, N-hydroxy lower alkyl-N-lower alkylphenylamino, N-hydroxy lower alkyl-N-lower alkoxyphenylamino, N-hydroxy lower alkyl-N-carboxy lower alkylamino, N,N-dicyano lower alkylamino, N-cyano lower alkyl-N-benzylamino, N-cyano lower alkyl-N-phenylamino, N-cyano lower alkyl-N-sulfophenylamino, N-cyano lower alkyl-N-chlorophenylamino, N-cyano lower alkyl-N-bromophenylamino, N-cyano lower alkyl-N-lower alkyl phenylamino, N-cyano lower alkyl-N-lower alkoxy phenylamino, N-cyano lower alkyl-N-carboxylphenylamino, N,N-dibenzylamino, N-benzyl-N-phenylamino, N-benzyl-N-sulfophenylamino, N-benzyl-N-chlorophenylamino, N-benzyl-N-bromophenylamino, N-benzyl-N-lower alkoxyphenylamino, N-benzyl-N-carboxyphenylamino, phenyloxy, sulfophenyloxy, lower alkoxy, lower alkoxy substituted lower alkoxy, lower alkylmercapto, hydroxy lower alkylmercapto, phenylmercapto, chlorophenylmercapto, or sulfophenylmercapto; and F is fluoro.

* * * * *